US012779590B2

(12) United States Patent
Soltani et al.

(10) Patent No.: US 12,779,590 B2
(45) Date of Patent: Nov. 3, 2026

(54) METHOD FOR MANUFACTURING WAFERS

(71) Applicants: DENSO CORPORATION, Kariya-city (JP); National University Corporation Saitama University, Saitama (JP)

(72) Inventors: Bahman Soltani, Kariya-city (JP); Koichiro Yasuda, Kariya-city (JP); Ryota Takagi, Kariya-city (JP); Tomoki Kawazu, Kariya-city (JP); Shunsuke Sobajima, Kariya-city (JP); Yutaro Isshiki, Kariya-city (JP); Sodai Nomura, Kariya-city (JP); Hideaki Shirai, Kariya-city (JP); Yohei Yamada, Saitama (JP); Junichi Ikeno, Saitama (JP)

(73) Assignees: DENSO CORPORATION, Kariya-city (JP); NATIONAL UNIVERSITY CORPORATION SAITAMA UNIVERSITY, Saitama (JP)

( * ) Notice: Subject to any disclaimer, the term of this patent is extended or adjusted under 35 U.S.C. 154(b) by 881 days.

(21) Appl. No.: 17/960,847

(22) Filed: Oct. 6, 2022

(65) Prior Publication Data

US 2023/0115673 A1 Apr. 13, 2023

(30) Foreign Application Priority Data

Oct. 7, 2021 (JP) ................................. 2021-165323
Dec. 8, 2021 (JP) ................................. 2021-199290

(51) Int. Cl.
*B23K 26/38* (2014.01)
*B23K 26/402* (2014.01)

(52) U.S. Cl.
CPC ............ *B23K 26/38* (2013.01); *B23K 26/402* (2013.01)

(58) Field of Classification Search
CPC ..... B23K 26/53; B23K 26/52; B23K 2101/40
See application file for complete search history.

(56) References Cited

U.S. PATENT DOCUMENTS

2008/0182353 A1* 7/2008 Zimmerman ..... H01L 21/02686 438/33
2015/0343562 A1 12/2015 Hirose et al.
(Continued)

FOREIGN PATENT DOCUMENTS

JP 2014147946 A 8/2014
JP 2016111143 A 6/2016
(Continued)

OTHER PUBLICATIONS

M. Naftaly, J. F. Molloy, B. Magnusson, Y. M. Andreev, and G. V. Lanskii, "Silicon carbideaa high-transparency nonlinear material for THz applications," Opt. Express 24, 2590-2595 (2016). < https://opg.optica.org/oe/fulltext.cfm?uri=oe-24-3-2590&id=335942> (Year: 2016).*
(Continued)

*Primary Examiner* — Rodolphe Andre Chabreyrie
(74) *Attorney, Agent, or Firm* — Harness, Dickey & Pierce, P.L.C.

(57) ABSTRACT

A manufacturing method for wafers includes: radiating a laser beam to a planned cutoff surface where the ingot is to be cutoff; and forming, with the radiation of the laser beam, a plurality of reformed sections at the planned cutoff surface to extend a crack from the reformed section, thereby slicing wafers, wherein an energy density of the laser beam exceeds a reforming threshold. The energy density satisfies at least one of conditions of a peak value of the energy density is lower than or equal to 44 J/cm$^2$, a rising rate of the energy density at a portion corresponding to the most shallow position where the energy density reaches the reforming threshold Eth is larger than or equal to 1000 J/cm$^3$, and a
(Continued)

range of depth where the energy density exceeds the reforming threshold is smaller than or equal to 30 μm.

9 Claims, 25 Drawing Sheets

(56) References Cited

U.S. PATENT DOCUMENTS

| | | | | |
|---|---|---|---|---|
| 2016/0158882 | A1 | 6/2016 | Hirata et al. | |
| 2017/0014943 | A1* | 1/2017 | Sabet | B23K 26/1224 |
| 2017/0250113 | A1* | 8/2017 | Vanagas | H01L 21/78 |
| 2017/0291254 | A1 | 10/2017 | Hirata | |
| 2018/0043468 | A1 | 2/2018 | Hirata | |
| 2018/0126484 | A1 | 5/2018 | Richter et al. | |
| 2018/0218896 | A1 | 8/2018 | Hirata | |
| 2018/0290232 | A1 | 10/2018 | Richter et al. | |
| 2019/0232433 | A1 | 8/2019 | Kitamura et al. | |
| 2019/0337100 | A1 | 11/2019 | Richter et al. | |
| 2020/0147729 | A1* | 5/2020 | Chang | B23K 26/362 |
| 2020/0269357 | A1 | 8/2020 | Omori et al. | |
| 2022/0339740 | A1* | 10/2022 | Bernard | B23K 26/0665 |
| 2023/0086426 | A1* | 3/2023 | Korematsu | B23K 26/53 219/121.6 |
| 2024/0058899 | A1 | 2/2024 | Richter et al. | |

FOREIGN PATENT DOCUMENTS

| | | | | |
|---|---|---|---|---|
| JP | 2017188586 A | | 10/2017 | |
| JP | 2018125390 A | | 8/2018 | |
| JP | 2018133484 A | | 8/2018 | |
| JP | 2018152582 A | | 9/2018 | |
| JP | 2019134155 A | | 8/2019 | |
| JP | 2020015091 A | | 1/2020 | |
| WO | WO-2019044588 A1 | * | 3/2019 | B23K 26/53 |

OTHER PUBLICATIONS

Edmund Optics. "Laser Power Density versus Energy Density". Nov. 26, 2020. < https://web.archive.org/web/20201126212250/https://www.edmundoptics.com/knowledge-center/application-notes/lasers/laser-power-density-versus-energy-density/> (Year: 2020).*

* cited by examiner

METHOD FOR MANUFACTURING WAFERS

CROSS-REFERENCE TO RELATED APPLICATION

This application is based on and claims the benefit of priority from earlier Japanese Patent Application Nos. 2021-165323 filed Oct. 7, 2021, and 2021-199290 filed Dec. 8, 2021 the description of both of which are incorporated herein by reference.

BACKGROUND

Technical Field

The present disclosure relates to a method for manufacturing wafers.

Description of the Related Art

A method for producing wafers from a semiconductor ingot includes a technique in which a laser beam may be radiated to the semiconductor ingot for slicing wafers from the ingot. Specifically, the laser beam is radiated to the ingot to form reformed sections at numerous locations along a planned cutoff surface within the ingot. Then, causing the reformed sections to be cracked, wafers are separated from the ingot.

SUMMARY

A first aspect of the present disclosure is a manufacturing method for wafers wherein a transparent or semi-transparent ingot is cutoff with a laser beam to obtain the wafers, the method comprising steps of: radiating the laser beam to the ingot at a plurality of portions from a direction crossing a planned cutoff surface where the ingot is to be cutoff; and forming, with the radiation of the laser beam, a plurality of reformed sections at a portion corresponding to a depth position of the planned cutoff surface in the ingot to extend a crack from the reformed section as an origin, thereby slicing wafers.

DETAILED DESCRIPTION OF THE PREFERRED EMBODIMENTS

A method for producing wafers from a semiconductor ingot includes a technique in which a laser beam may be radiated to the semiconductor ingot for slicing wafers from the ingot. Specifically, the laser beam is radiated to the ingot to form reformed sections at numerous locations along a planned cutoff surface within the ingot. Then, causing the reformed sections to be cracked, wafers are separated from the ingot.

However, when forming numerous reformed sections, the reformed sections may be formed at locations shallower than the target location. In other words, the reformed sections can be formed at target depth locations, but some reformed sections may be formed at other depth locations. This multi-staged reformed section may cause an increase in material-loss of the semiconductor ingot, which causes a low yield.

As a conventional technique, for example, Japanese Patent Application Laid-Open Publication Number 2014-147946 discloses a technique in which an annular part of the laser beam is condensed at a predetermined portion of an object to be processed, whereby fine reformed sections are accurately formed.

With this technique, it is difficult to avoid the multi-stage reformed section by simply radiating the annular part of the laser beam. Hence, a problem in which the yield of slicing wafers is reduced still remains.

Hereinafter, embodiments of the present disclosure will be described.

First Embodiment

With reference to FIGS. 1 to 11, embodiments of wafer manufacturing method will be described. As shown in FIGS. 1 to 9, the manufacturing method of the present embodiment is a method for obtaining a water 20 by cutting an ingot 2 with a laser beam L. Here, the ingot 2 is transparent or semi-transparent.

Figure 1:
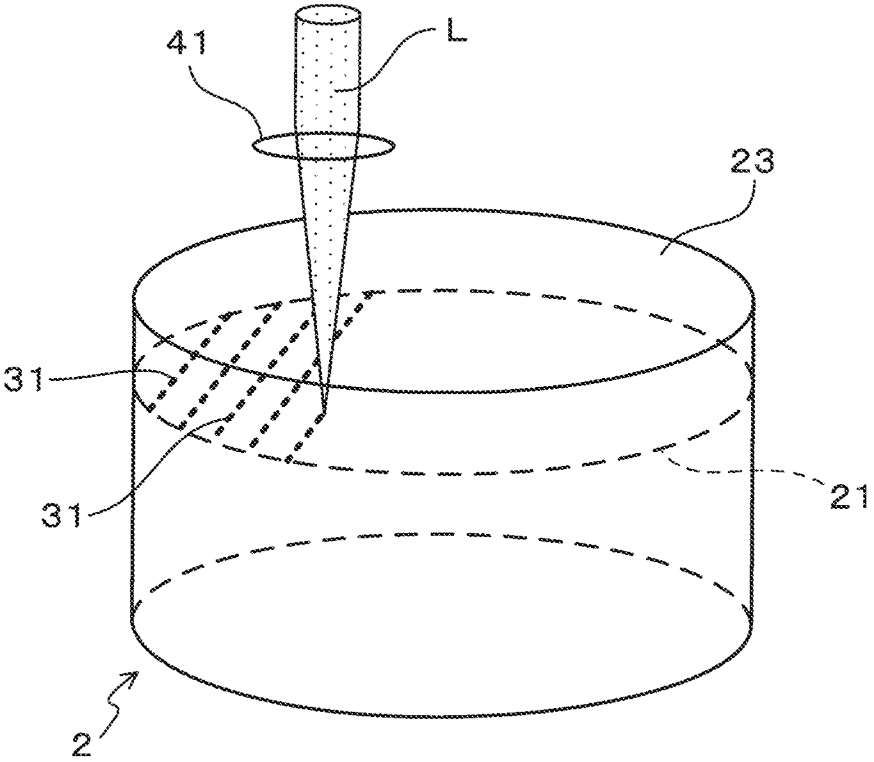
FIG. 1 is a perspective explanatory diagram illustrating a manufacturing method for waters according to a first embodiment.
Figure 2:
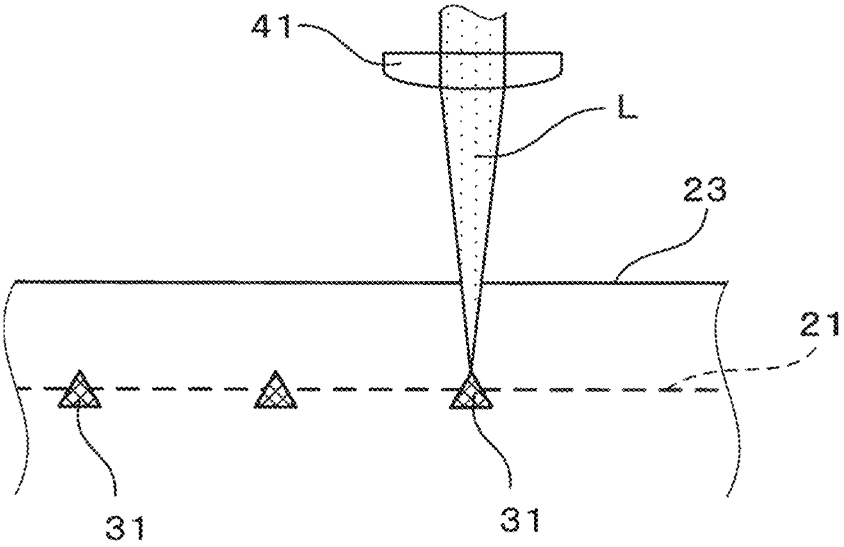
FIG. 2 is an explanatory diagram illustrating a state where the laser beam is radiated to a planned cutoff surface when viewed from a direction parallel to the planned cutoff surface according to the first embodiment.
Figure 5:
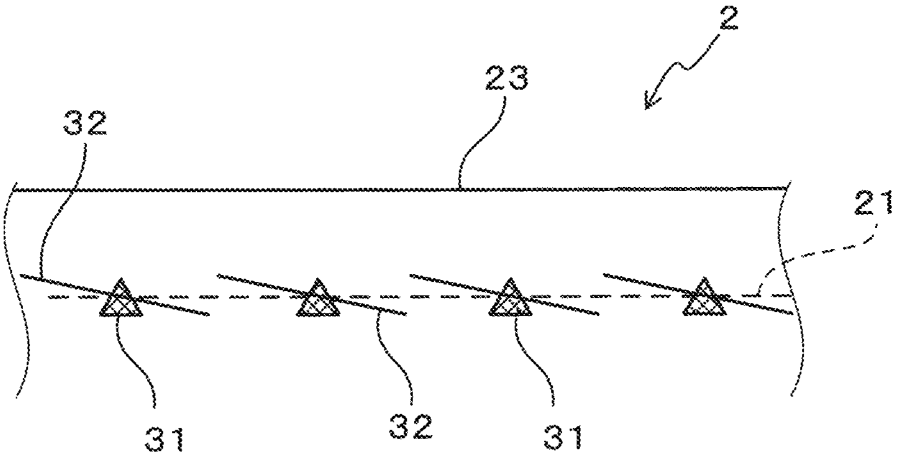
FIG. 5 is a cross-sectional explanatory diagram illustrating an ingot where the reformed section and cracks are formed when viewed from a direction parallel to the planned cutoff surface according to the first embodiment.
Figure 6:
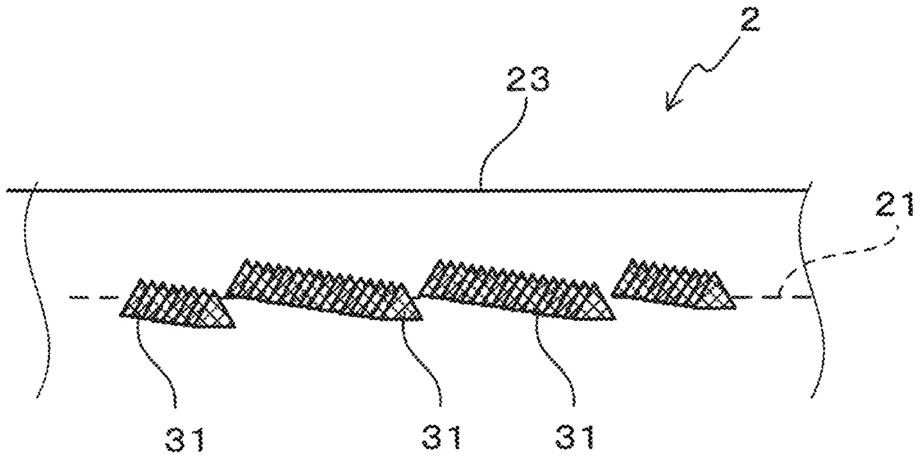
FIG. 6 is a cross-sectional explanatory diagram illustrating an ingot where the reformed section and cracks are formed when viewed from a direction parallel to the planned cutoff surface in the case where the virtual line is positioned along a direction where an off angle is formed according to the first embodiment.
Figure 7:
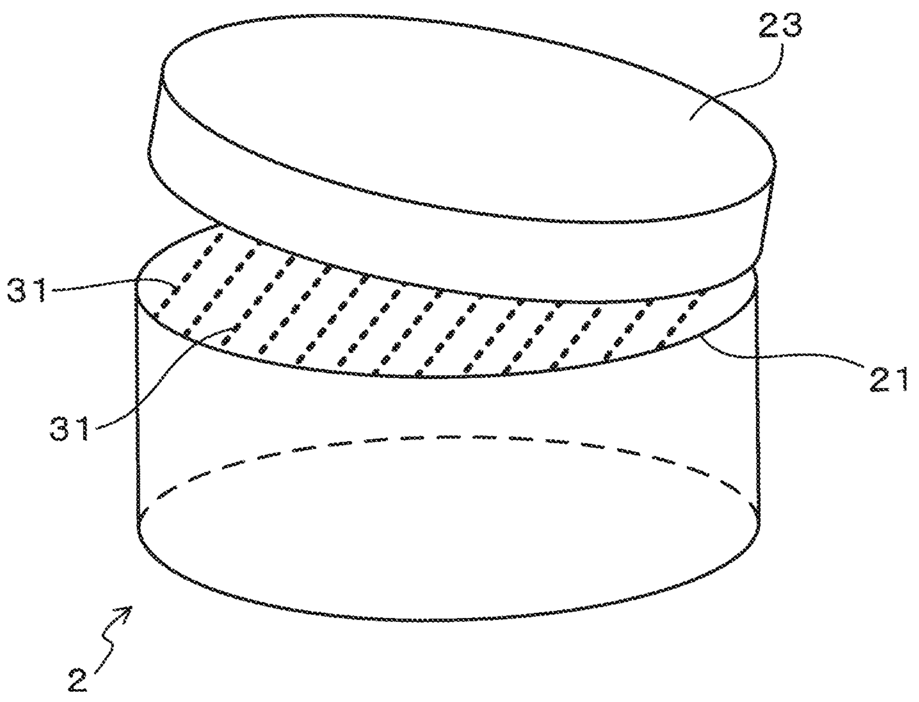
FIG. 7 is a perspective explanatory diagram illustrating a state where a wafer is separated from the ingot according to the first embodiment.
Figure 8:
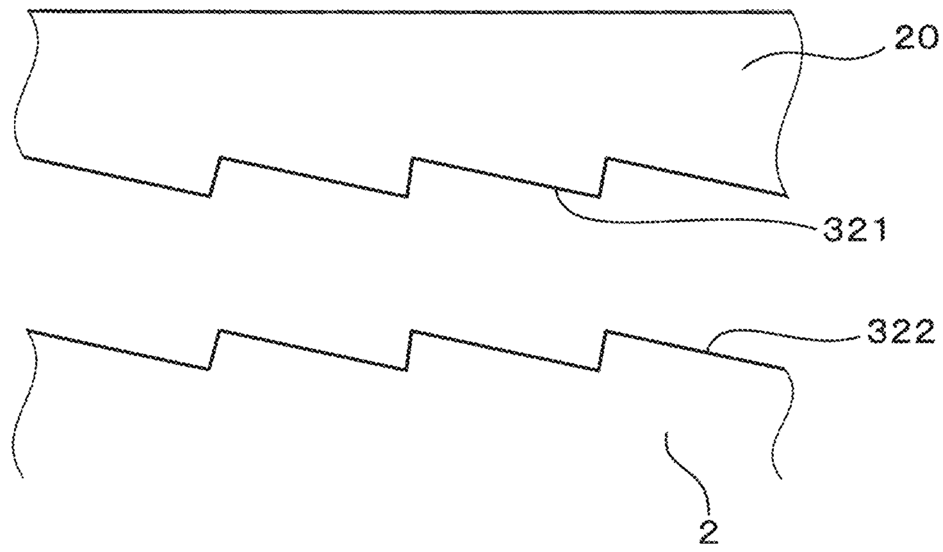
FIG. 8 is a cross-sectional explanatory diagram illustrating an upper surface of the ingot and a lower surface of the wafer immediately after the wafer is separated according to the first embodiment.

Firstly, as shown in FIGS. 1 and 2, the laser beam L is radiated to the ingot 2 at a plurality of portions from a direction crossing a planned cutoff surface 21 where the ingot 2 is to be cutoff. Thus, as shown in FIGS. 2 and 3A-38, a plurality of reformed sections 31 are formed at a portion corresponding to the depth of the planned cutoff surface 21 in the ingot 2. Then, as shown in FIG. 5, a crack 32 is caused to extend from the reformed section 31 as an origin. Thus, as shown in FIGS. 7 and 8, the wafer 20 is sliced from the ingot 2.

An energy density as an energy per unit area of the laser beam L in the ingot 2 when radiating the laser beam to the ingot 2 satisfies the following condition. The energy density of the laser beam L exceeds a reforming threshold Eth on the planned cutoff. Note that the reforming threshold Eth refers to a threshold of an energy density capable of reforming a part of the ingot 2.

The energy density further satisfies at least one of the following conditions 1, 2 and 3.

condition 1: peak value of the energy density is lower than or equal to 44 $J/cm^2$ condition 2: rising rate of the energy density at a portion corresponding to the most shallow position where the energy density reaches the reforming threshold Eth is larger than or equal to 1000 $J/cm^3$. Note that rising rate of the energy density refers to an amount of rise of the energy density per unit depth.

condition 3: range of depth where the energy density exceeds the reforming threshold Eth is smaller than or equal to 30 μm.

Figure 10:
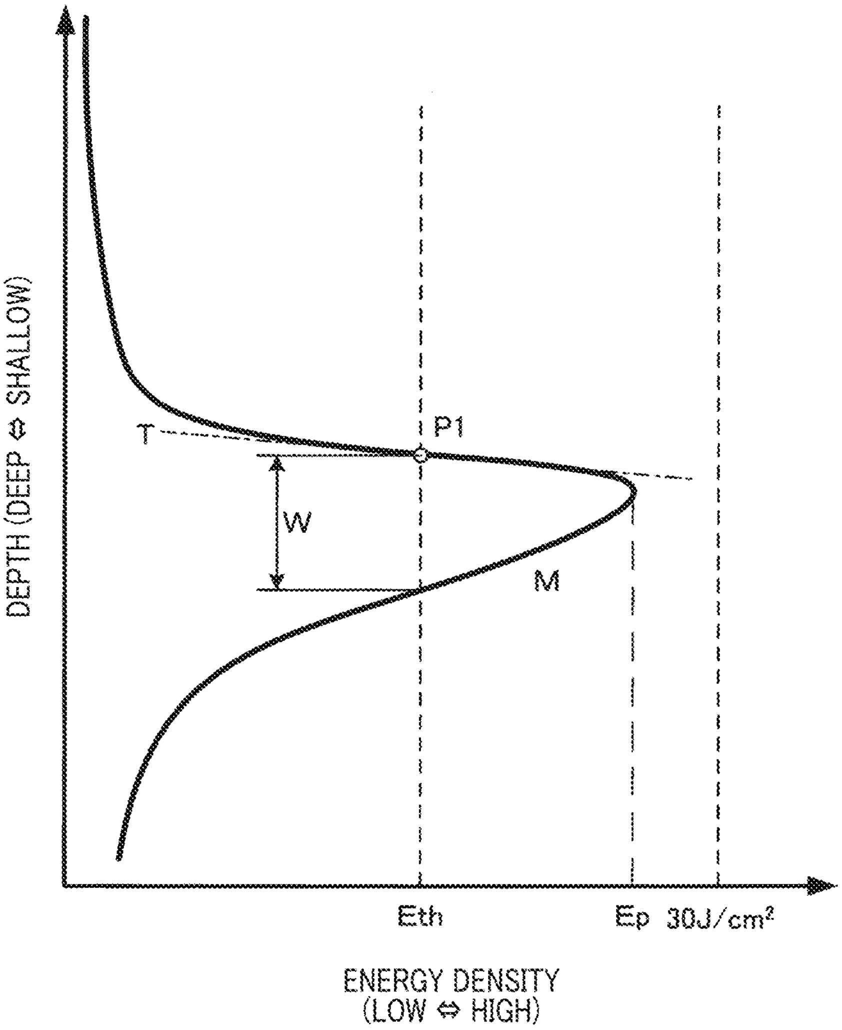
FIG. 10 is a diagram illustrating a relationship between a depth from the surface of the ingot and an energy density of the laser beam according to the first embodiment.

With reference to FIG. 10, conditions for the above-described energy density will be described. The curve M in FIG. 10 roughly shows an example of a relationship between the depth from the surface of the ingot 2 and the energy density of the laser beam L when the laser beam L is radiated to the ingot 2. Here, the surface of the ingot 2 refers to a surface which serves as an incident surface of the laser beam L. The vertical axis of FIG. 10 indicates a depth from the surface of the ingot such that it becomes deeper towards the down side. The horizontal axis indicates an energy density of the laser light such that the energy density becomes higher towards the right side.

As shown in FIG. 10, the laser beam L is radiated to the ingot 2 such that the energy density becomes larger at a certain depth position. Here, the energy density is set to be at least larger than or equal to the reforming threshold Eth at a depth position of the planned cutoff surface 21. On the other hand, at least one of the above-described conditions 1-3 is satisfied. More preferably, all of the above-described conditions may be satisfied.

As the condition 1, the peak value Ep of the energy density is set to be lower than or equal to 44 $J/cm^3$. Note that the peak value Ep of the energy density Ep is simply referred to as peak value Ep.

As the condition 2, the energy density rising rate at the most shallow depth position where the energy density reaches the reforming threshold Eth is set to be larger than or equal to 1000 J/cm$^3$. In other words, in FIG. 10, inclination of the tangential line T of the curve M at a point P1 is set to be larger than or equal to 1000 J/cm$^3$. At point P1, an amount of rise of the energy density per unit depth is 1000 J/cm$^3$ or larger. Specifically, the energy density rising rate at the most shallow depth position where the energy density reaches the reforming threshold Eth is larger than or equal to 1000 J/cm$^3$. Hereinafter, the energy density rising rate at the most shallow depth position where the energy density reaches the reforming threshold Eth is also simply referred to as energy density rising rate $\alpha$.

As the condition 3, the depth range where the energy density exceeds the reforming threshold Eth is set to be smaller than or equal to 30 μm. This means, in FIG. 10, a width of the range indicated by symbol W is 30 μm or less. Hereinafter, a depth range where the energy density exceeds the reforming threshold Eth is simply referred to as depth range W.

According to the present embodiment, the ingot 2 is configured of SiC (i.e. silicon carbide). As shown in FIG. 1, the ingot 2 has a substantially cylindrical shape. The laser beam L is radiated from a surface corresponding to either one of a pair of substantially cylindrical shaped bottom surfaces to the ingot 2 having corresponding material and shape. Note that a surface of the ingot 2 on which the laser beam L is incident is referred to as an upper surface 23 for the sake of convenience. The upper surface 23 of the ingot 2 is a planar surface. According to the present embodiment, the laser beam radiated to the ingot 2 is a pulse laser light of which the pulse width is 250 fs to 10 ns.

As shown in FIGS. 1 and 2, the planned cutoff surface 21 is parallel to the upper surface 23. The planned cutoff surface 21 is set at a depth position from the upper surface 23 corresponding to the thickness of the wafer 20 to be obtained. The laser beam L is radiated from the upper surface of the ingot 2 such that numerous reformed sections 31 are formed on the planned cutoff surface 21. The laser beam L passes through a condenser lens 41, thereby radiating the ingot 21 such that the energy density is larger than or equal to the reforming threshold Eth at a depth position of the planned cutoff surface 21. For the reformed sections 31, a part of the ingot 2 composed of SiC single crystal becomes a separated state of noncrystalline Si (silicon) and noncrystalline C (carbon) due to the energy of the laser beam L, thereby forming the reformed sections 31.

Figure 3A:
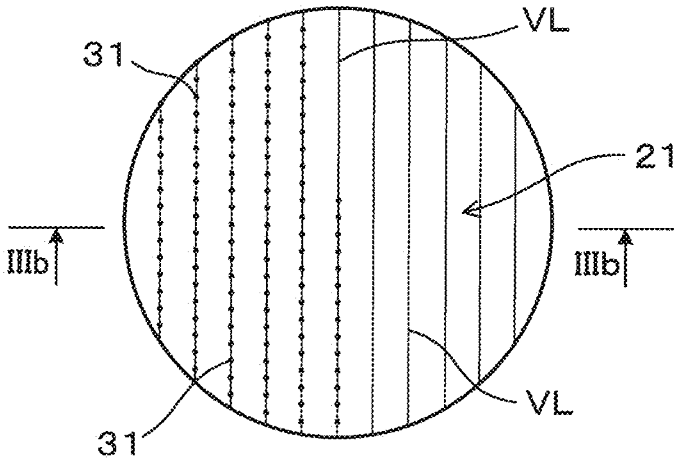
FIG. 3A is an explanatory diagram illustrating the planned cutoff surface with a virtual line and numerous reformed sections in the case where the virtual line crosses a direction where an off angle is formed according to the first embodiment.
Figure 3B:
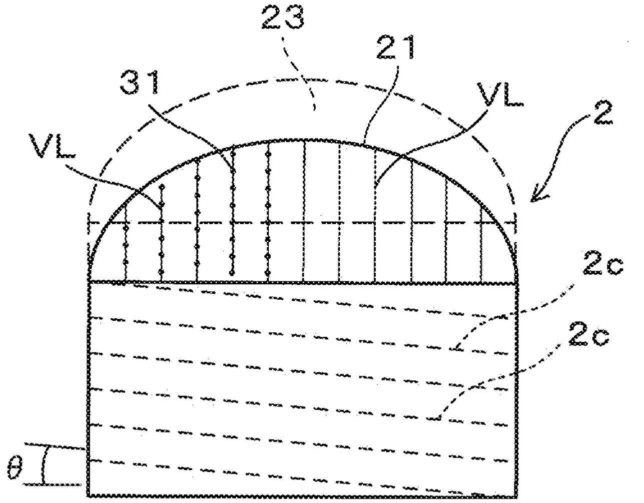
FIG. 3B is an explanatory diagram corresponding to a cross-sectional view sectioned along line IIIb-IIIb in FIG. 3A, illustrating a relationship between the off angle and the virtual line according to the first embodiment.

As shown in FIGS. 1 to 38, the laser beam L is condensed at numerous portions on the planned cutoff surface 21 of the ingot 2. As shown in FIGS. 3A and 3B, numerous reformed sections 31 are formed along a plurality of mutually parallel virtual lines VL on the planned cutoff surface 21. The laser beam L is caused to scan the ingot 2 along the virtual lines VL. The virtual lines VL can be orthogonal to a direction defined by the off angle θ of the ingot 2. In Figs. 3A-3B, for the reformed sections 31, only a part of reformed sections 31 is shown. Practically, the reformed sections 31 on the virtual lines VL are densely formed to be mutually overlapped. Also, in FIG. 3B, a dotted line indicated by the reference symbol 2*c* indicates a c-surface inclined by the off angle θ relative to the upper surface 23 of the ingot 2. The same applies to FIG. 4B.

Figure 4A:
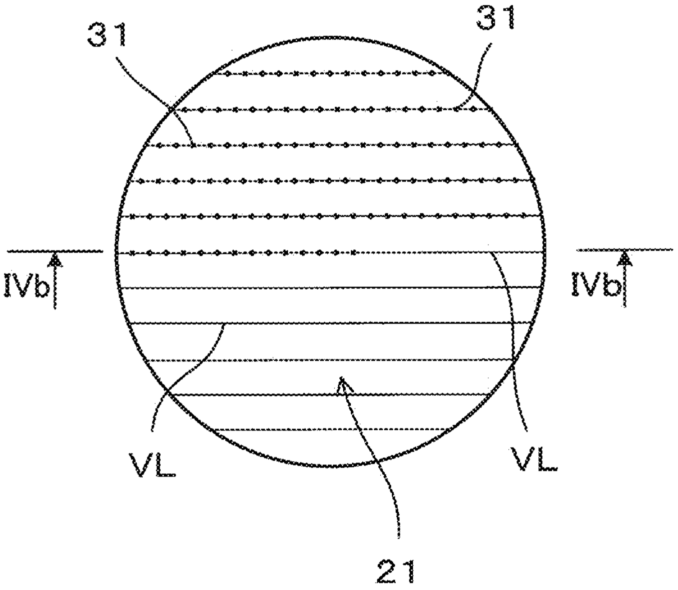
FIG. 4A is an explanatory diagram illustrating the planned cutoff surface with a virtual line and numerous reformed sections in the case where the virtual line is positioned along a direction where an off angle is formed according to the first embodiment.
Figure 4B:
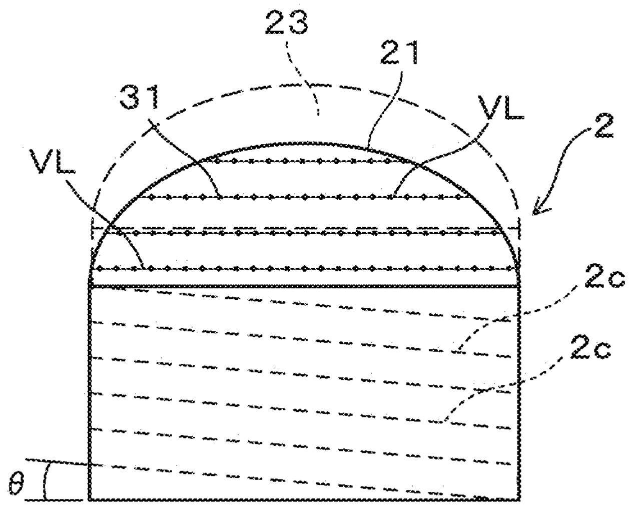
FIG. 4B is an explanatory diagram corresponding to a cross-sectional view sectioned along line IVb-IVb in FIG. 4A, illustrating a relationship between the off angle and the virtual line according to the first embodiment.

However, as shown in FIGS. 4A and 4B, the virtual line VL can be a line parallel to a direction where the off angle θ is formed on the ingot 2 when viewed from the axial direction of the ingot 2. In this case, an inclination of off angle θ appears on a cross-section parallel to both of the axial direction of the ingot 2 and the virtual line VL. The pulse-shaped laser beam L is caused to scan the ingot 2 along such a virtual line VL. Thus, numerous reformed sections 31 are formed on a plurality of virtual lines VL.

When the reformed sections 31 are formed in the ingot 2, as shown in FIG. 5, the crack 32 is produced with an origin of the reformed section 31. The crack 32 is extended along the c-surface of the ingot 2. The c-surface is inclined by a constant off angle θ relative to the upper surface 23. There are a very large number of c-surfaces present within the ingot 2. According to the present embodiment, the off angle may be set to be 4°, for example.

Therefore, the crack 32 is formed being inclined by, for example, 4° with respect to the upper surface 23. As described above, since numerous reformed sections 31 are formed on the planned cutoff section 21, when the reformed sections 31 are appropriately arranged, the cracks are consistently connected. Thus, as shown in FIGS. 7 and 8, the wafer 20 is separated from the ingot on a surface substantially along the planned cutoff surface 21.

Figure 9:
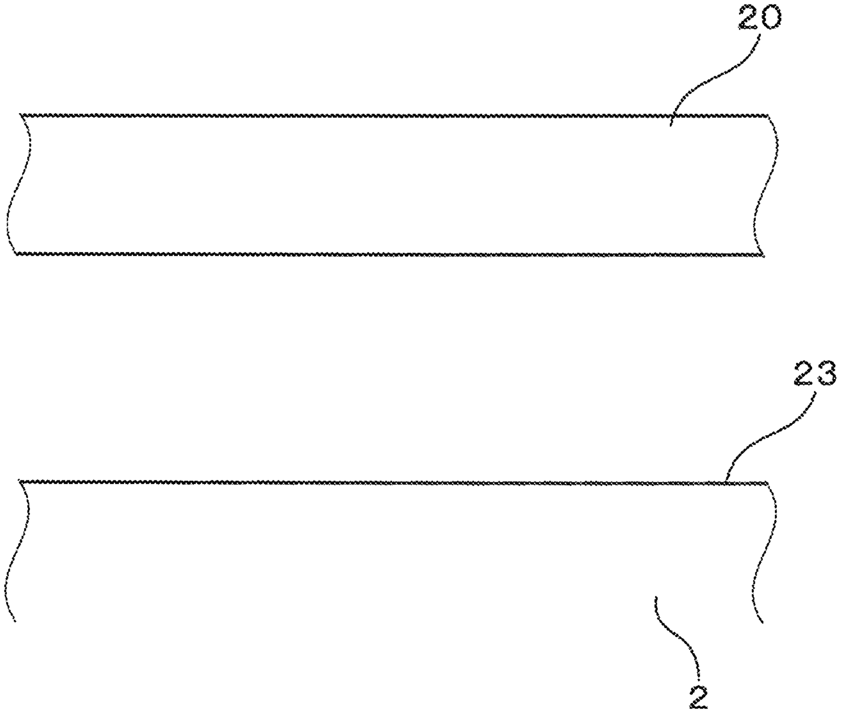
FIG. 9 is a cross-sectional explanatory diagram illustrating an upper surface of the ingot and a lower surface of the wafer after a polishing process according to the first embodiment.

However, as described above, the crack 32 is inclined relative to the upper surface 23 and also inclined relative to the planned cutoff surface 21. Hence, as shown in FIG. 8, the cutoff surfaces 321 and 322 formed by the cracks 32, being consistently connected, are uneven surface where many concave and convex portions are formed. These uneven cutoff surfaces 321 and 322 generated on the wafer 20 and the ingot 2 are polished using a grindstone. Thus, as shown in FIG. 9, the wafer 20 is obtained and also the upper surface 23 of the ingot 2 after cutoff is planarized.

As described above, when the virtual line VL is parallel to the direction where the off angle θ is formed (see FIG. 4A and FIG. 4B), the uneven portions can be minimized. In this case, as shown in FIG. 6, adjacent reformed sections 31 are aligned on the virtual line VL. These reformed sections 31 are partially aligned in a direction where the off angle θ is formed, but are positioned within the above-described depth range W. Hence, the unevenness can be significantly smaller.

Figure 11:
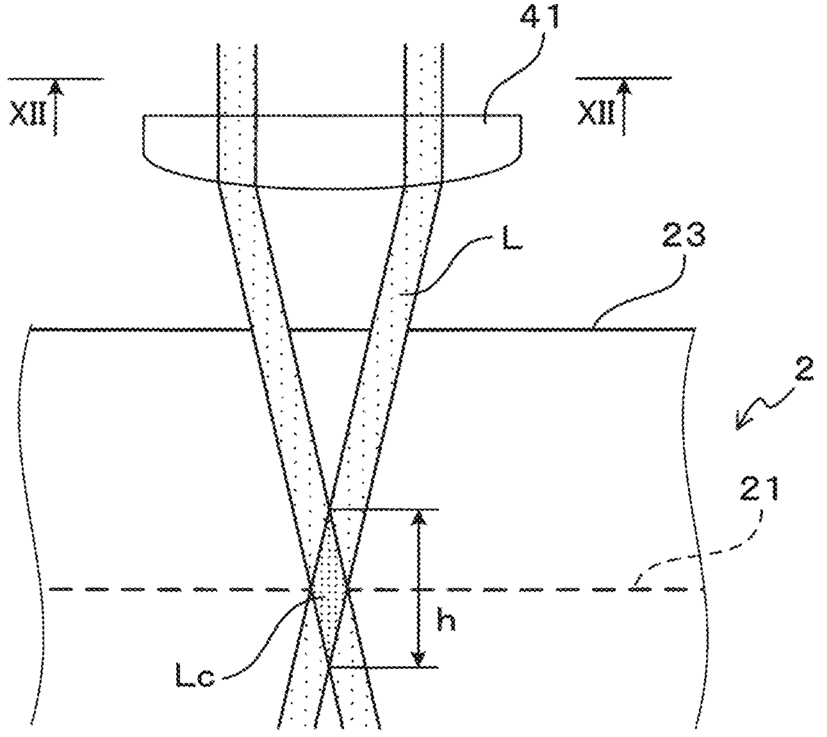
FIG. 11 is a cross-sectional explanatory diagram illustrating a state where an annular laser beam is condensed on the planned cutoff surface according to the first embodiment.

According to the present embodiment, when forming the reformed section 31, as shown in FIG. 11, the laser beams are simultaneously radiated from a plurality of directions to the ingot 2. The laser beams from the plurality of directions are mutually overlapped in a part of the depth region including a depth position of the planned cutoff surface 21 of the ingot 2. The overlapped portion Lc has a length h in the depth direction of 5 to 50 μm. Here, the depth direction corresponds to the normal direction of the upper surface 23 of the ingot 2.

Note that simultaneous radiation of the laser beams from a plurality of directions to the ingot 2 includes a case where single laser beam is radiated from the plurality of directions and a case where a plurality of laser beams are radiated from the plurality of directions.

Figure 12:
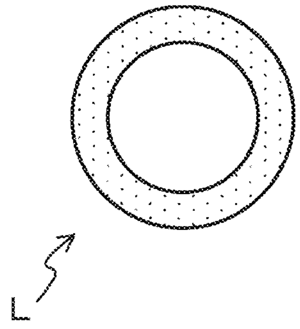
FIG. 12 is a diagram illustrating a cross-sectional view sectioned along line XII-XII in Fig. 11.

According to the present embodiment, an annular laser beam is utilized as a laser beam. For the annular laser beam, as shown in FIG. 12, the shape of a cross-section sectioned along a line orthogonal to the optical axis excluding the overlapped portion Lc has an annular shape, for example. Specifically, the annular laser beam is formed having an annular intensity distribution in a portion except for the overlapped portion Lc. The annular laser beam can be a laser beam simultaneously radiated from the plurality of directions to the ingot 2.

In particular, according to the present embodiment, the above-described cross-sectional shape (i.e. intensity distribution) is an annular shape. The annular laser beam has an annular cross-sectional shape before being incident on the condenser lens 41. As shown in FIG. 11, the annular laser beam is refracted at the condenser lens 41 to form an overlapped portion Lc in the ingot 2. The overlapped portion Lc has a length in the depth direction h of 5 to 50 μm. Further, the overlapped potion Lc is set to be formed in a depth region including a depth position of the planned surface 21.

The laser beam is radiated such that the above-described overlapped portion Lc is provided, thereby controlling the energy density of the laser beam radiated to the ingot 2.

Next, effects and advantages of the present embodiment will be described. In the manufacturing method of the above-described wafers, the energy density of the laser beam L radiated to the ingot 2 is controlled in the above-described manner. In more detail, the energy density of the laser beam L is controlled to be at least larger than or equal to the reforming threshold Eth at a depth position of the planned cutoff surface 21 and then controlled to satisfy at least one of the above-described conditions 1, 2 and 3. Specifically, at least one of the peak value Ep of the energy density of the laser beam L, the rising rate of the energy density α and the depth range W is controlled to be in a predetermined range (see FIG. 10). Thus, the reformed section 31 is formed at the desired depth position while preventing the reformed section from being multi-staged section. Accordingly, material loss of the ingot 2 is suppressed and the manufacturing yield can be improved.

The energy density of the laser beam L radiated to the ingot 2 is controlled to satisfy at least one of the conditions 1, 2 and 3, whereby the reformed section 31 can be prevented from being a multi-staged section. In the case where the energy density of the laser beam L satisfies none of conditions 1, 2 and 3, a problem arises where multi-staged reformed sections occur at many locations (see later-described FIG. 13B). When the reformed sections 31 are multi-staged at many locations, a thickness corresponding to the multi-staged reformed section causes material loss. In this respect, according to the present embodiment, respective parameters related to the energy density of the laser beam are controlled in the above-described manner, whereby the material-loss is suppressed and the manufacturing yield of the wafer 20 can be improved.

A mechanism of the reformed section becoming multi-stage and a suppression mechanism of the multi-staged reformed section will be described as follows.

Figure 13A:
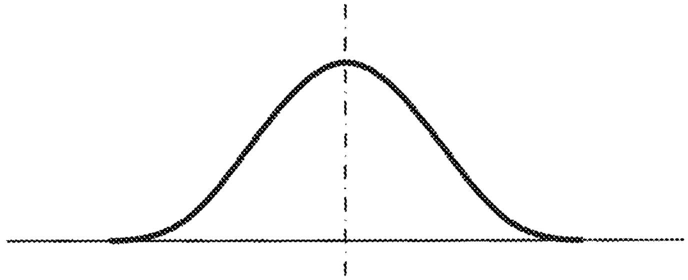
FIG. 13A is a diagram showing an intensity distribution of Gaussian beam.
Figure 13B:
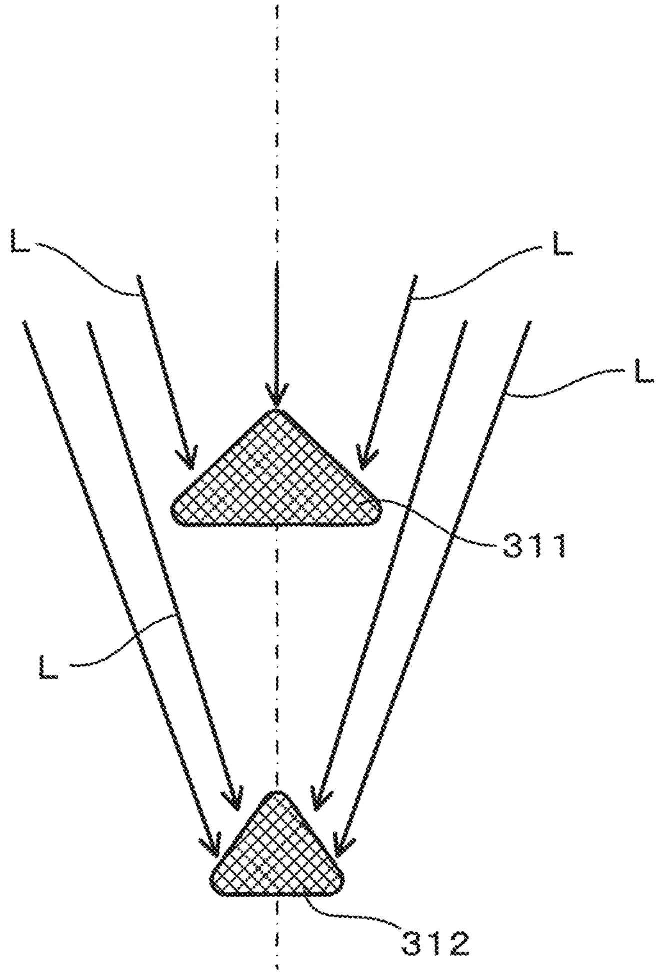
FIG. 13B is an explanatory view explaining a multistage of the reformed section.
Figure 14:
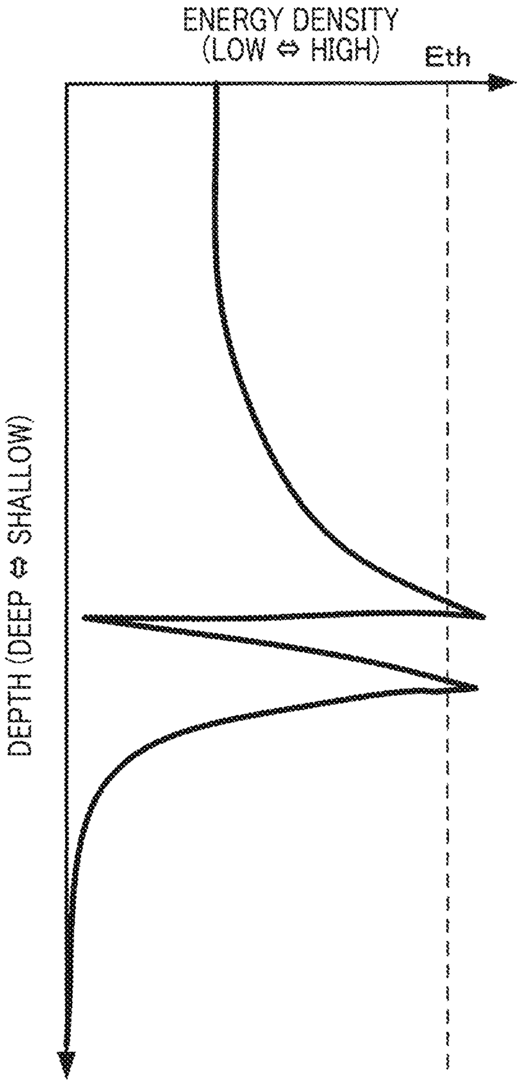
FIG. 14 is a diagram showing a relationship between the depth in the ingot and the energy density of the laser beam when a multistage reformed section is formed.

For example, the inventors of the present disclosure discovered a phenomenon, as shown in FIG. 13B, in which the reformed sections 311 and 312 may be formed at a plurality of depth positions in the case where the laser beams having Gaussian distribution shown in FIG. 13A are condensed and radiated to the ingot 2. This is because, a part of the laser beam around the optical axis of the laser beam are condensed at a relatively shallow depth position and the energy density exceeds the reforming threshold Eth to form the reformed section 311. Accompanying with this, a part of the laser beam away from the optical axis of the laser beam diffracts from an outer periphery side of the reformed section 311 and is condensed at a relatively deep position, and the energy density exceeds the reformed threshold Eth to form the reformed section 312. Thus, as shown in FIG. 14, the energy density exceeds the reforming threshold Eth at a plurality of depth positions of the ingot 2. As a result, as shown in FIG. 13B, the reformed sections 311 and 312 are formed in a multi-stage.

Figure 15A:
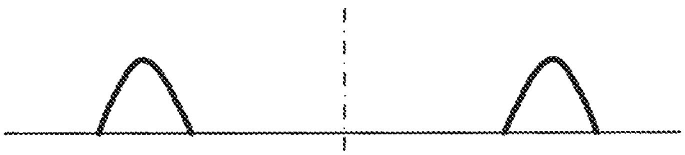
FIG. 15A is a diagram showing an intensity distribution of an annular laser beam.
Figure 15B:
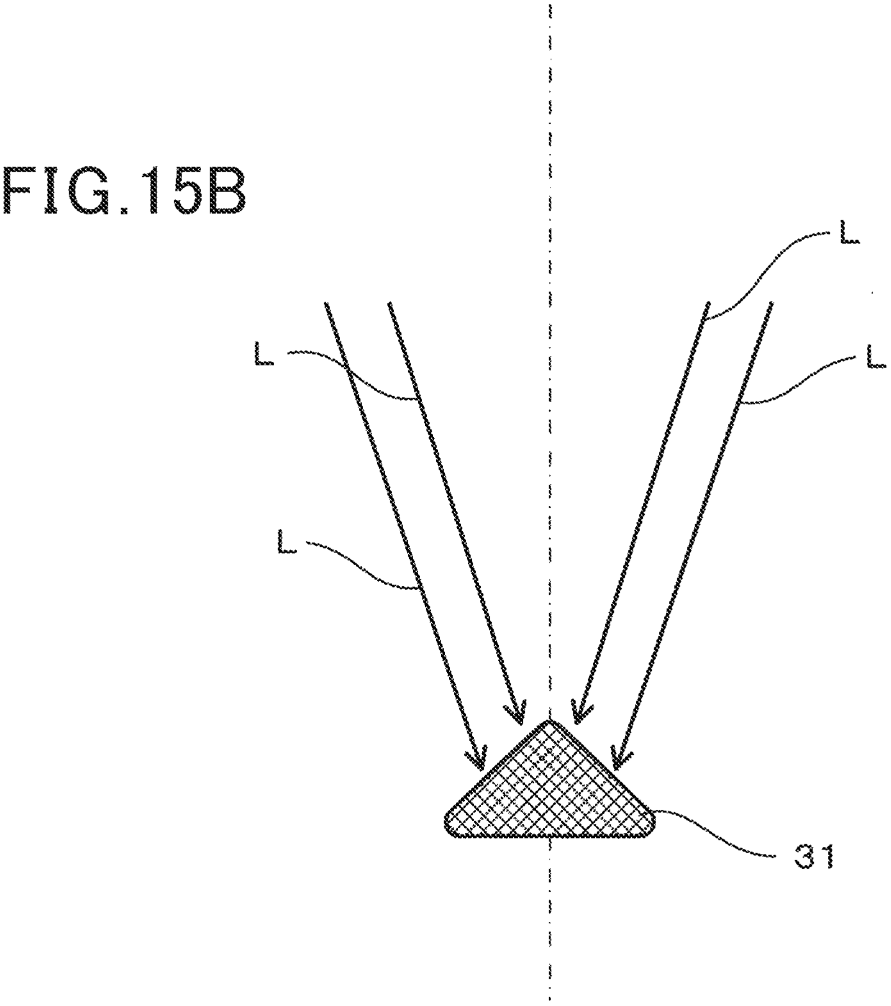
FIG. 15B is a diagram explaining a state where the reformed section is prevented from having a multistage structure.
Figure 16:
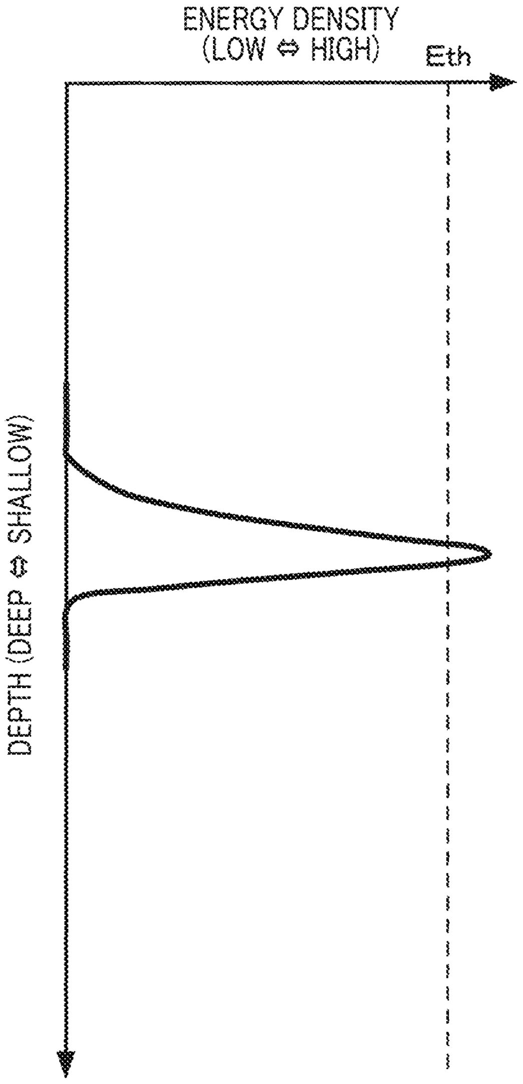
FIG. 16 is a diagram showing a relationship between the depth in the ingot and the energy density of the laser beam when a multistage reformed section is not formed.

In contrast, according to the present embodiment, as shown in FIG. 15A, annular laser beams having no energy density in the vicinity of the optical axis are condensed and radiated to the ingot 2 so as to form an overlapped portion at a target depth position as shown in FIG. 15B. In this case, as shown in FIG. 16, the energy density exceeds the reformed threshold Eth at the target depth position, that is, a depth position of the planned cutoff surface 21 and the reformed section 31 is formed as shown in FIG. 15B. At this moment, as shown in FIG. 16, no laser beams having energy density which exceeds the threshold are present in depth positions excluding the depth position of the planned cutoff surface 21. Hence, the reformed sections can be prevented from being multi-staged reformed sections.

Under such a mechanism, it is controlled to satisfy at least one of conditions 1 to 3, whereby the reformed section can be prevented from being multi-staged. Also, the energy density is controlled to satisfy all of the conditions 1 to 3, whereby the reformed section can be further prevented from being multi-staged.

Further, the laser beam L radiated to the ingot 2 is a pulse laser beam of which the pulse width ranges from 250 fs to 10 ns. Thus, the reformed sections are formed at the desired depth position while preventing the reformed section from being multi-staged section.

The length h of the overlapped portion Lc of the laser beam from a plurality of directions to the ingot 2 is from 5 to 50 μm (see FIG. 11). With this configuration, the respective parameters of the energy density can readily and reliably be controlled to the predetermined range. As a result, the manufacturing yield of the wafer 20 can be improved.

As described above, according to the present embodiment, a manufacturing method for wafers capable of improving the manufacturing yield can be provided.

Assuming that the virtual line VL is a straight line parallel to a direction where the off angle θ of the ingot 2 when viewed from the axial direction of the ingot 2, as described above, height of the uneven portions of the cutoff surfaces 321 and 322 can be significantly small. As a result, a material loss of the ingot 2 can be suppressed.

Experiment Example

The present example confirms an effect of preventing the reformed section from being multi-staged by controlling the peak value Ep, the energy density rising rate α and the depth range W to be in a range described in the above-described first embodiment.

As described, inventors of the present disclosure have found that multi-staged reformed sections are suppressed by controlling the peak value Ep, the energy density rising rate α and the depth range W to be in a predetermined range. The predetermined range is summarized as follows.

condition 1: peak value Ep is less than or equal to 44 $J/cm^2$ condition 2: energy density rising rate α is larger than or equal to 1000 $J/cm^3$ condition 3: depth range W is less than or equal to 30 μm In this respect, according to the present example, samples are produced, that is, a sample A where the laser beam is radiated to the ingot so as to satisfy all of the conditions 1 to 3, samples B, C, D where the laser beam is radiated to the ingot so as to satisfy at lease-least one of the conditions 1 to 3, and a sample E where the laser beam is radiated to the ingot to satisfy none of the conditions 1 to 3. Hereinafter, specific methods of the present example will be described. Note that methods which are not particularly specified in the present example are the same as those in the first embodiment. The scanning direction of the laser beam (i.e. direction indicated by virtual line VL) is set to be a direction orthogonal to the direction where the off angle is formed (see Fig.3B).

For respective samples A to E, a pulse laser beam is radiated to the ingot at a plurality of locations. At this time, the pulse laser beam is continuously radiated linearly along the virtual line VL (see FIGS. 3A-38) for multiple times. The radiation pitch is set to be 0.5 μm. Also, many virtual lines VL are provided where the array pitch of the virtual lines is set to be 100 μm.

Further, the wavelength of the pulse laser beam to be radiated is set to be 1030 nm, the pulse width is set to be 10 ps, and the oscillation frequency is set to be 10 kHz. Hereinafter, respective conditions variously changed for the samples A to E will be described.

<Sample A>

As described above, the radiation condition of the laser beam is set so as to satisfy the conditions 1 to 3 as follows. As the condenser lens, a pair of Axicon are used to condense the annular laser beam and radiated the condensed laser beam to the ingot. The radiated laser beam has an outer diameter of 2 mm and an inner diameter of 1 mm before being condensed by the condenser lens. The pulse energy was set to be 3 μJ.

Figure 17:
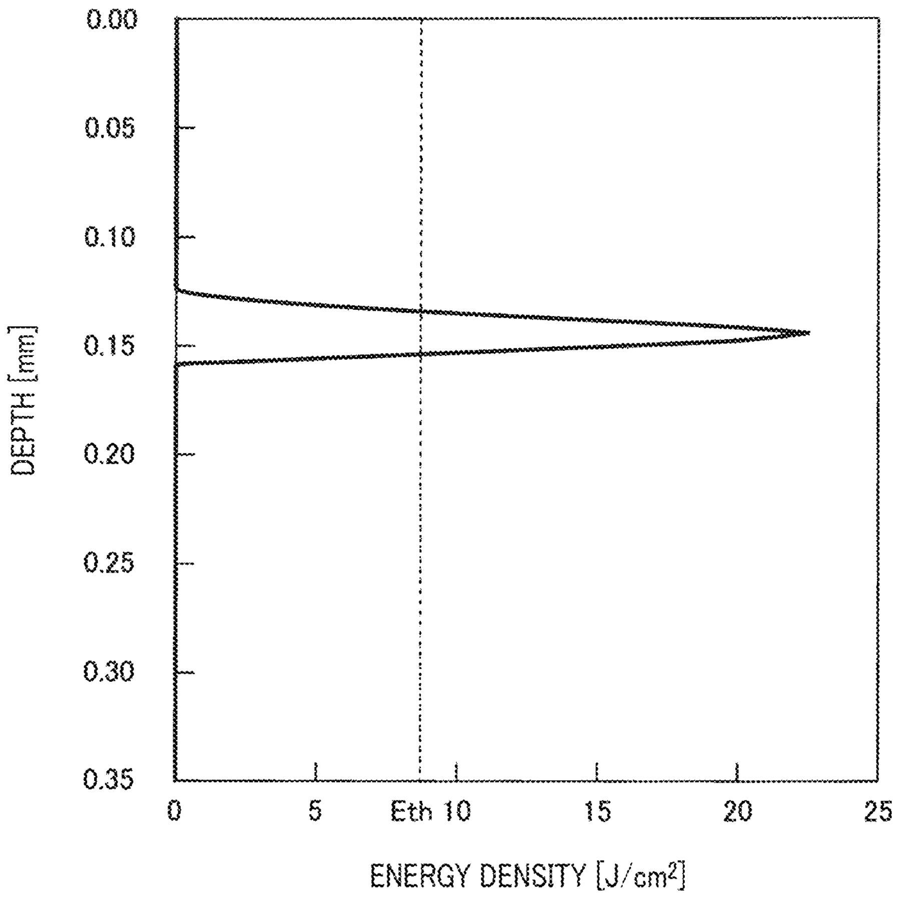
FIG. 17 is a diagram showing a relationship between the depth from a surface of the ingot and the energy density of the laser beam when a sample A is produced according to an experiment example.

At this time, a state of the energy density of the laser beam radiated into the ingot (i.e. relationship between the depth from the upper surface of the ingot and the energy density) is shown in FIG. 17. The actual measurement data obtained under the conditions 1 to 3 are shown in table 1.

TABLE 1

| Sample: A | | | | |
|---|---|---|---|---|
| | | target value | experimental value | Result |
| condition 1 | peak value Ep | ≤44 J/cm$^2$ | 22.5 J/cm$^2$ | OK |
| condition 2 | energy density rising rate α | ≥1000 J/cm$^3$ | 1454 J/cm$^2$ | OK |
| condition 3 | depth range W | ≤30 μm | 18 μm | OK |

In table 1, the experiment values are readable from the graph shown in FIG. 17 and calculated in accordance with an outer diameter of the laser beam being incident on the condenser lens, NA value (numerical aperture value), a distance between the condenser lens and the ingot, a depth from the upper surface of the ingot, a refraction factor of the ingot and the like. In the column of 'result', OK means that result satisfies the target values under the respective conditions, and NG means that the result does not satisfy the target values under the respective conditions. The same applies to the later-described tables 2 to 5.

Figure 18:
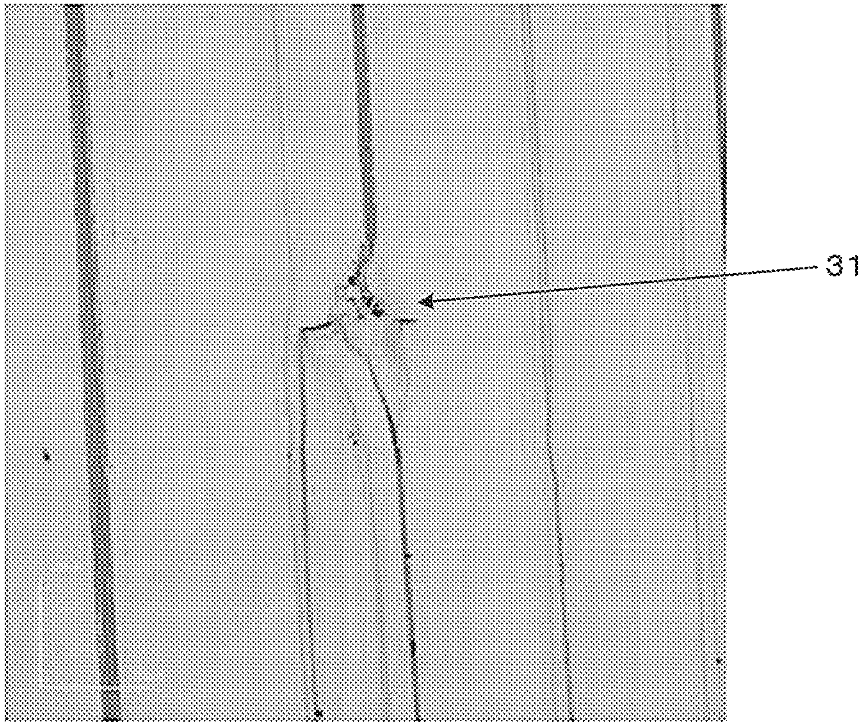
FIG. 18 is photos showing cross-sectional view of the sample A at 2 locations according to an experiment example.
Figure 18:
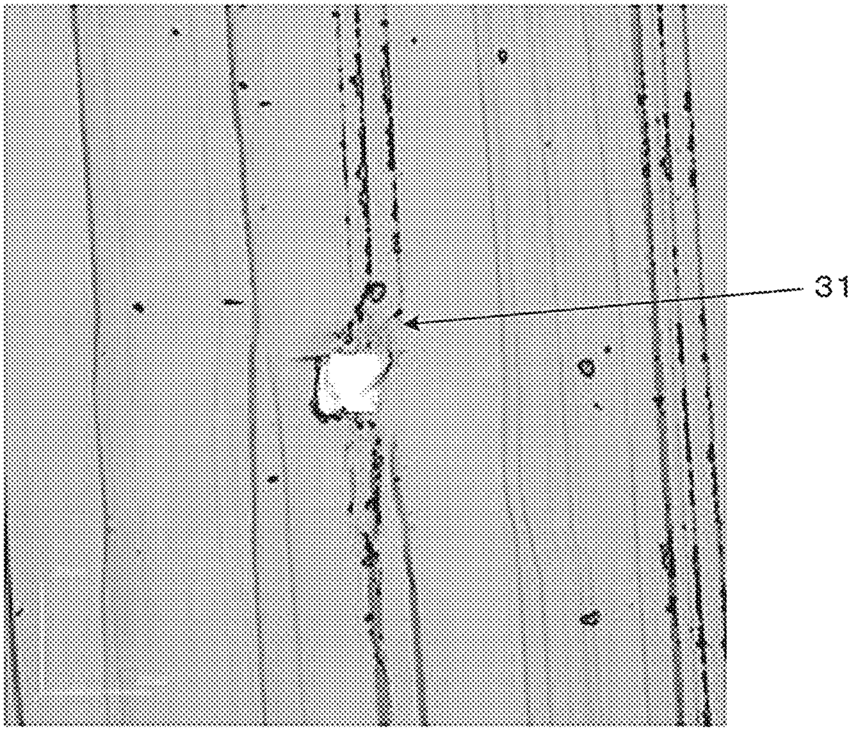

Then, for the sample A, the ingot was cutoff and the inside of the ingot was observed. FIG. 18 shows photos taken by a metallurgical microscope (magnification is about 100). In FIG. 18, two different photos are attached where these photos are cross-sectional photos at two different locations of the sample A. The same applies for the later described similar photos. In each photo, a portion pointed to by an arrow 31 refers to a reformed section. As these photos show, no multi-staged reformed section is observed in the sample A.

<Sample B>

For producing the sample B, a pulse energy of the laser beam radiated to the ingot was 6 μJ. Other radiation conditions were the same as those of the sample A.

Figure 19:
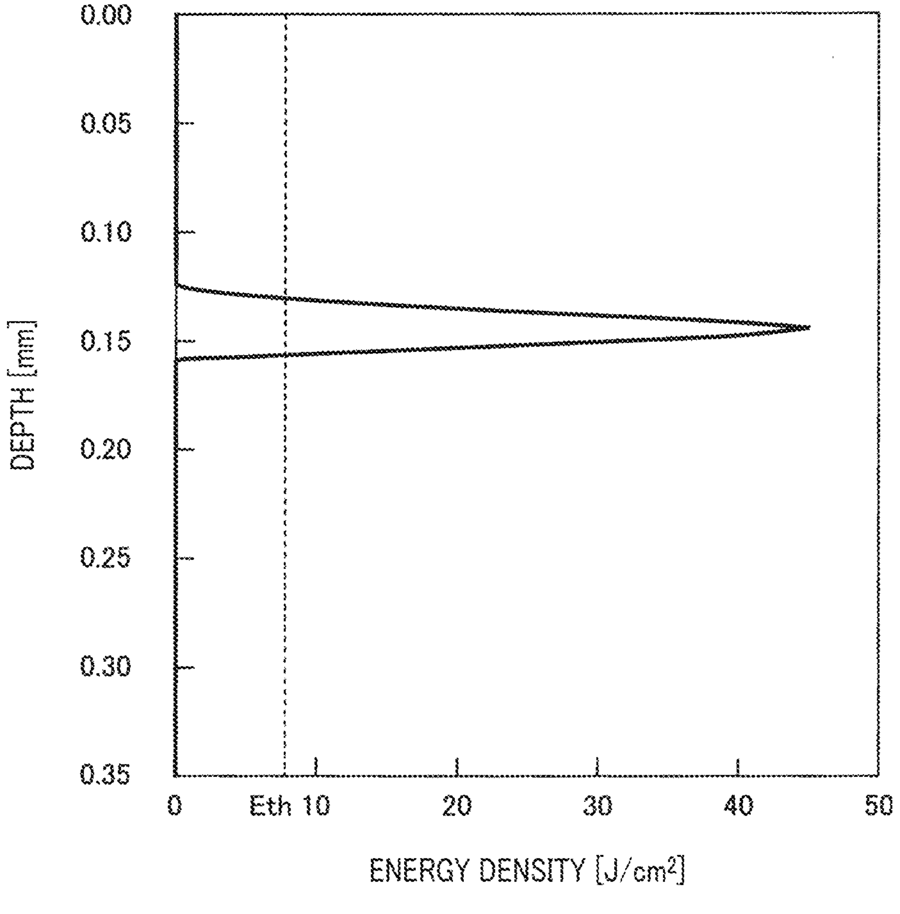
FIG. 19 is a diagram showing a relationship between the depth from a surface of the ingot and the energy density of the laser beam when a sample B is produced according to an experiment example.

At this moment, a state of the energy density of the laser beam radiated to the ingot (i.e. relationship between the depth from the upper surface of the ingot and the energy density) is shown in FIG. 19. Note that the graph of FIG. 19 is taken under a condition where the laser beam is radiated for one time in the ingot. The same applies to the later described FIGS. 21, 23, 25 and 27. The actual measurement data under the conditions 1 to 3 are shown in table 2.

TABLE 2

| Sample: B | | | | |
|---|---|---|---|---|
| | | target value | experimental value | Result |
| condition 1 | peak value Ep | ≤44 J/cm$^2$ | 45.0 J/cm$^2$ | NG |
| condition 2 | energy density rising rate α | ≥1000 J/cm$^3$ | 2809 J/cm$^2$ | OK |
| condition 3 | depth range W | ≤30 μm | 22 μm | OK |

As shown in table 2, the sample B does not satisfy the condition 1, but satisfies the conditions 2 and 3. That is, the energy density rising rate α is sufficiently large and the depth range is sufficiently small.

Figure 20:
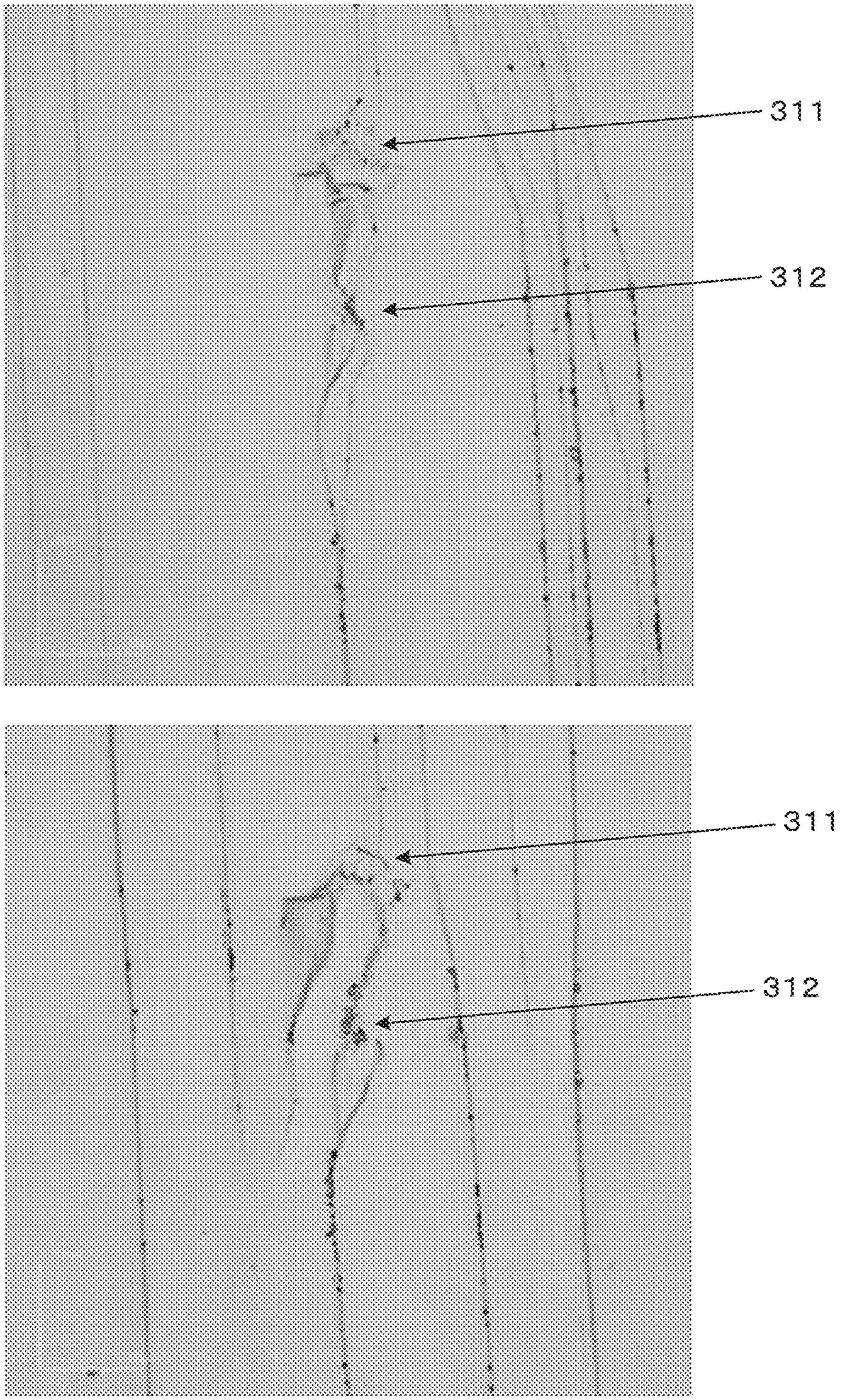
FIG. 20 is photos showing cross-sectional view of the sample B at 2 locations according to an experiment example.

Then, for the produced sample B, the ingot was cutoff and the inside thereof was observed. FIG. 20 shows photos taken by a metallurgical microscope (magnification is about 100). As shown in FIG. 20, a multi-staged reformed section was observed in the sample B. In other words, it was observed that the reformed sections 311 and 312 were formed at two locations in the depth direction. However, the scale of the multi-staged portion in the reformed section is small and the area of the reformed section is small. Here, the area of the reformed section refers to a region in the depth direction where the reformed section is formed in the ingot.

<Sample C>

For producing the sample C, the laser beam radiated to the ingot was a Gaussian beam. That is, a laser beam was used, having a Gaussian intensity distribution where the center thereof is the optical axis. The radiated laser beam has an outer diameter, before being condensed at the condenser lens, of 2.2 mm. The pulse energy was set to be 3 μJ.

Figure 21:
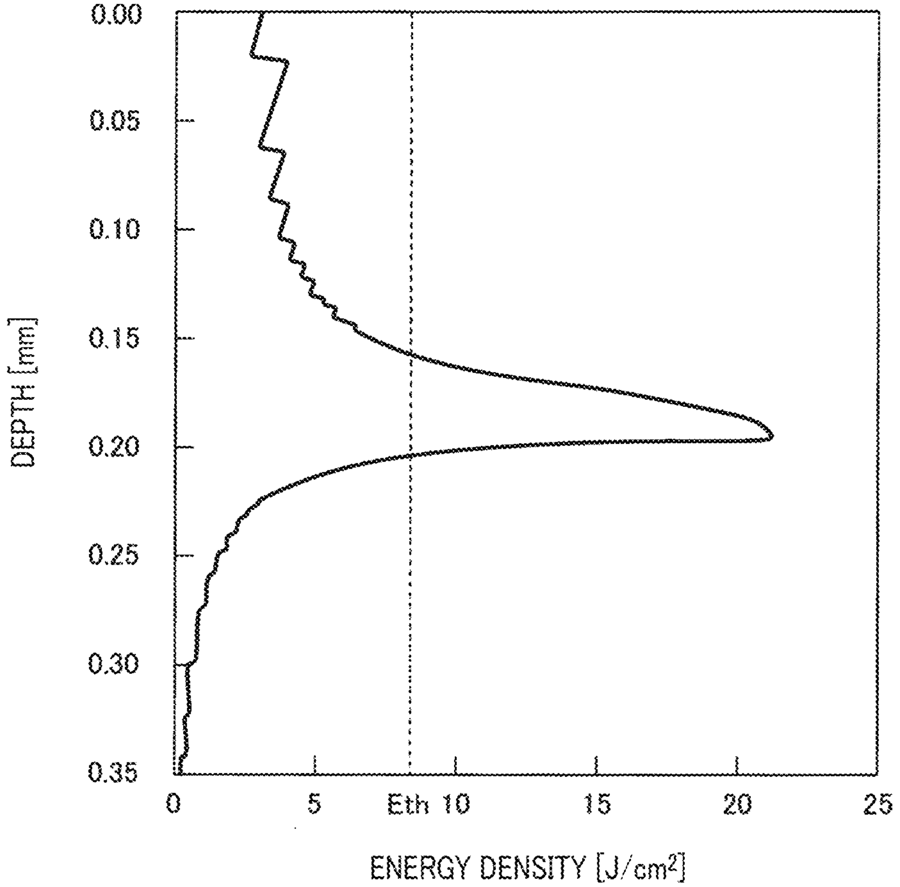
FIG. 21 is a diagram showing a relationship between the depth from a surface of the ingot and the energy density of the laser beam when a sample C is produced according to an experiment example.

At this moment, a state of the energy density of the laser beam radiated to the ingot (i.e. relationship between the depth from the upper surface of the ingot and the energy density) is shown in FIG. 21. The actual measurement data under the conditions 1 to 3 are shown in table 3.

TABLE 3

| Sample: C | | | | |
|---|---|---|---|---|
| | | target value | experimental value | Result |
| condition 1 | peak value Ep | ≤44 J/cm$^2$ | 21.1 J/cm$^2$ | OK |
| condition 2 | energy density rising rate α | ≥1000 J/cm$^3$ | 321 J/cm$^2$ | NG |
| condition 3 | depth range W | ≤30 μm | 48 μm | NG |

As shown in table 3, the sample C does not satisfy the conditions 2 and 3, but satisfies the condition 1. That is, the peak value Ep is sufficiently suppressed.

Figure 22:
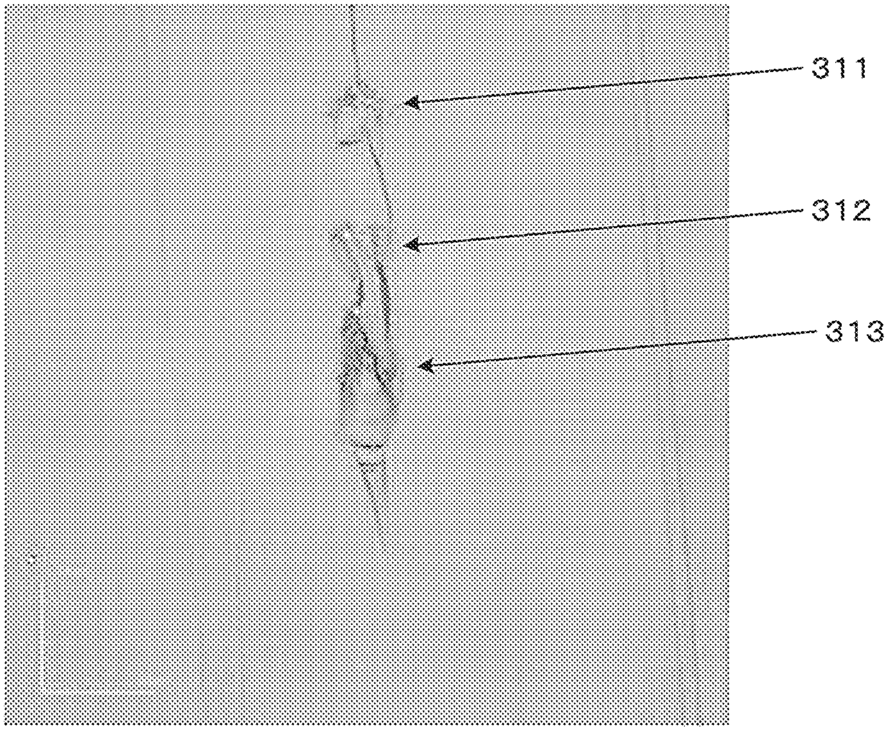
FIG. 22 is photos showing cross-sectional view of the sample C at 2 locations according to an experiment example.
Figure 22:
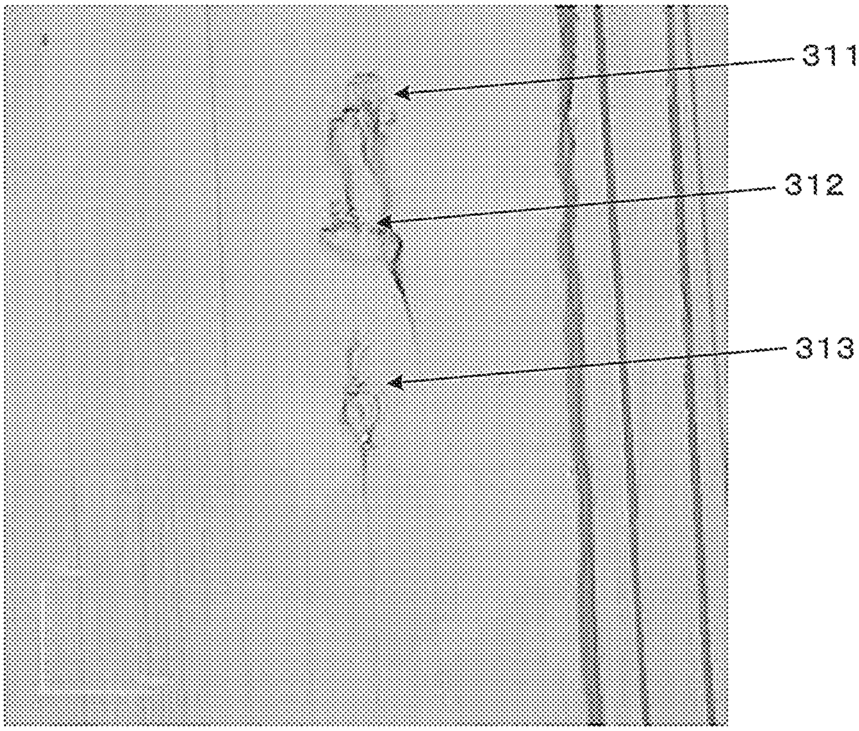

Then, for the produced sample C, the ingot was cutoff and the inside thereof was observed. Fig.22 shows photos taken by a metallurgical microscope (magnification is about 100). As shown in photos of Fig. 22, a multi-staged reformed section was observed in the sample C. Also, it was observed that the reformed sections 311, 312 and 313 were formed in the sample C at three locations in the depth direction. However, compared to the sample E which will be described later, the scale of the multi-staged portion in the reformed section is small and the area of the reformed section is small.

<Sample D>

For producing the sample D, the laser beam radiated to the ingot has an outer diameter before being condensed at the condenser lens was set to be 1.8 mm and the inner diameter was set to be 0.2 mm. Other radiation conditions were the same as those of the sample A.

Figure 23:
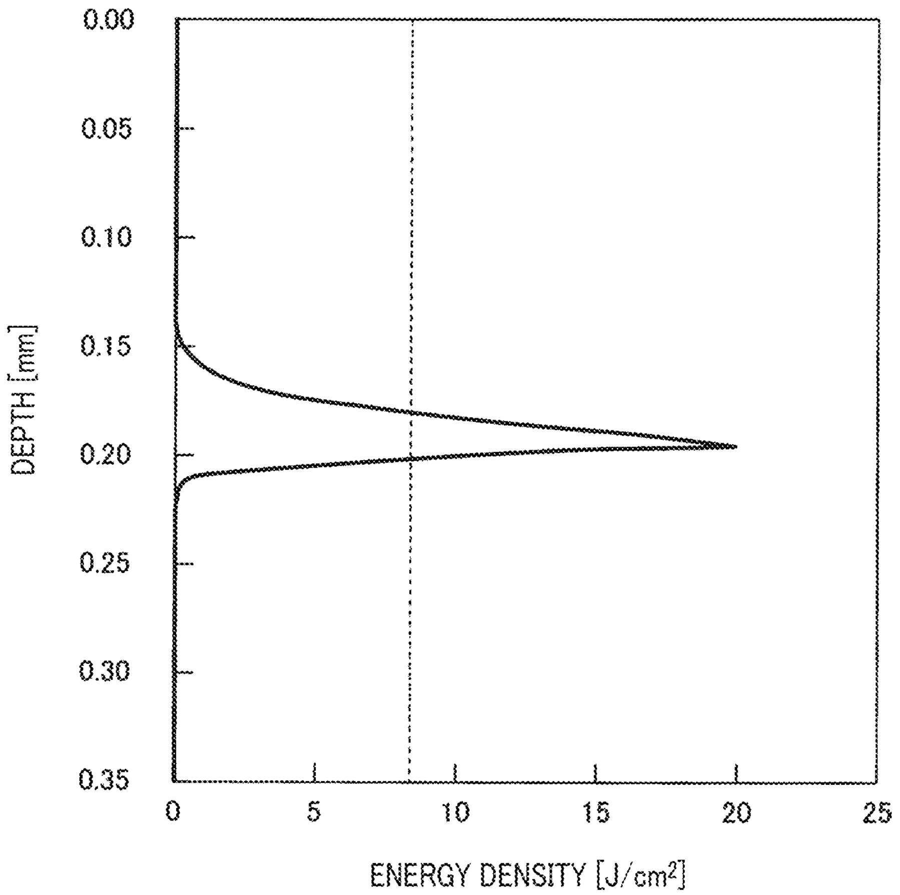
FIG. 23 is a diagram showing a relationship between the depth from a surface of the ingot and the energy density of the laser beam when a sample D is produced according to an experiment example.

At this time, a state of the energy density of the laser beam radiated into the ingot (i.e. relationship between the depth from the upper surface of the ingot and the energy density) is shown in FIG. 23. The actual measurement data obtained under the conditions 1 to 3 are shown in table 4.

TABLE 4

| Sample: D | | | | |
|---|---|---|---|---|
| | | target value | experimental value | Result |
| condition 1 | peak value Ep | ≤44 J/cm$^2$ | 19.9 J/cm$^2$ | OK |
| condition 2 | energy density rising rate α | ≥1000 J/cm$^3$ | 710 J/cm$^2$ | NG |
| condition 3 | depth range W | ≤30 μm | 22 μm | NG |

As shown in table 4, the sample D does not satisfy the condition 2, but satisfies the conditions 1 and 3. That is, the peak value Ep is sufficiently suppressed and the depth range W is sufficiently small.

Figure 24:
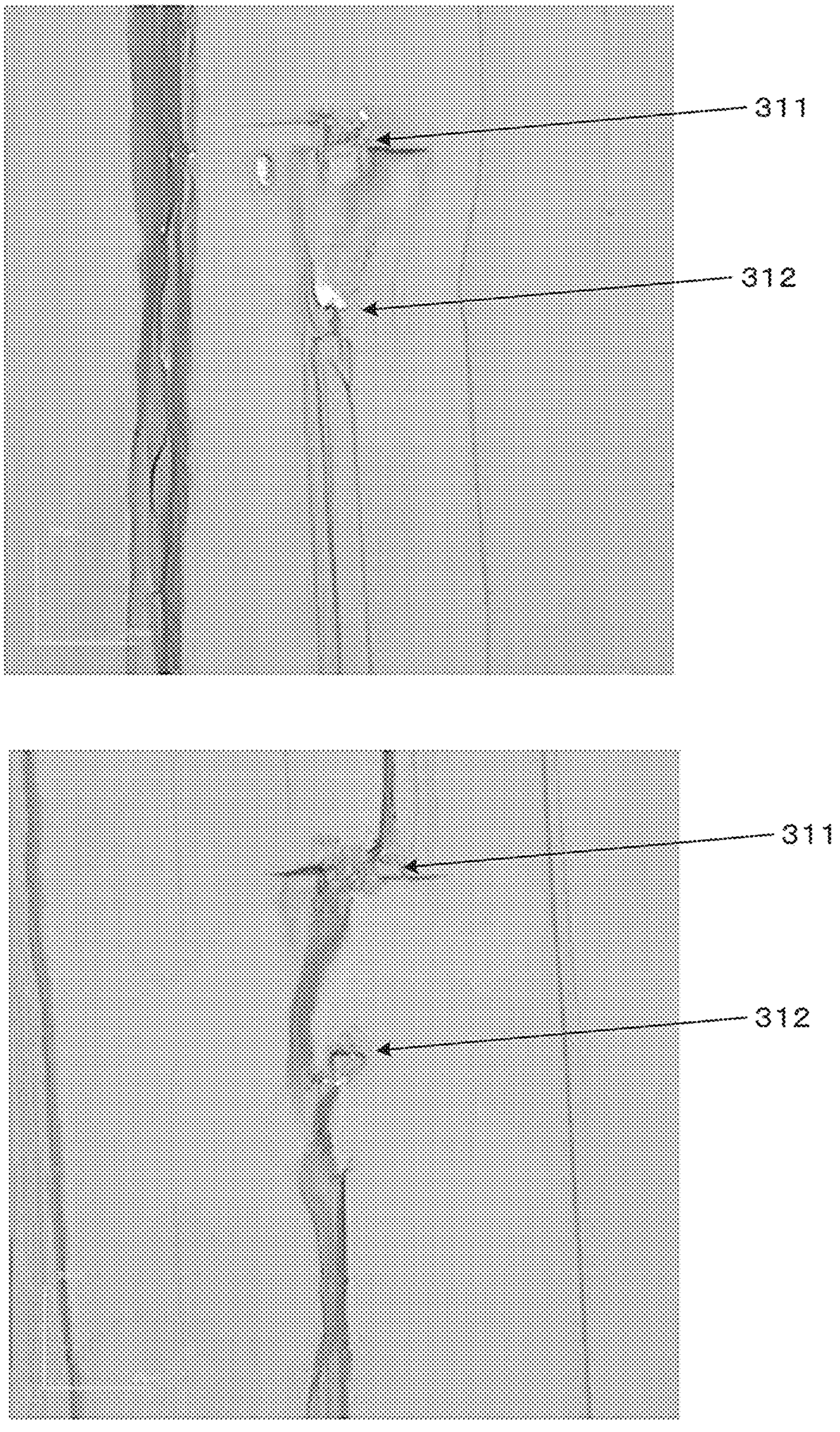
FIG. 24 is photos showing cross-sectional view of the sample D at 2 locations according to an experiment example.

Then, for the produced sample D, the ingot was cutoff and the inside thereof was observed. FIG. 24 shows photos taken by a metallurgical microscope (magnification is about 100). As shown in photos of FIG. 24, a multi-staged reformed section was observed in the sample D. In other words, it was observed that the reformed sections 311 and 312 were formed at two locations in the depth direction. However, the scale of the multi-staged portion in the reformed section is small and the area of the reformed section is small.

<Sample E>

For producing the sample E, the laser beam radiated to the ingot was a Gaussian beam. That is, a laser beam was used, having a Gaussian intensity distribution where the center thereof is the optical axis. The radiated laser beam has an outer diameter, before being condensed at the condenser lens, of 2.2 mm. The pulse energy was set to be 9 μJ.

Figure 25:
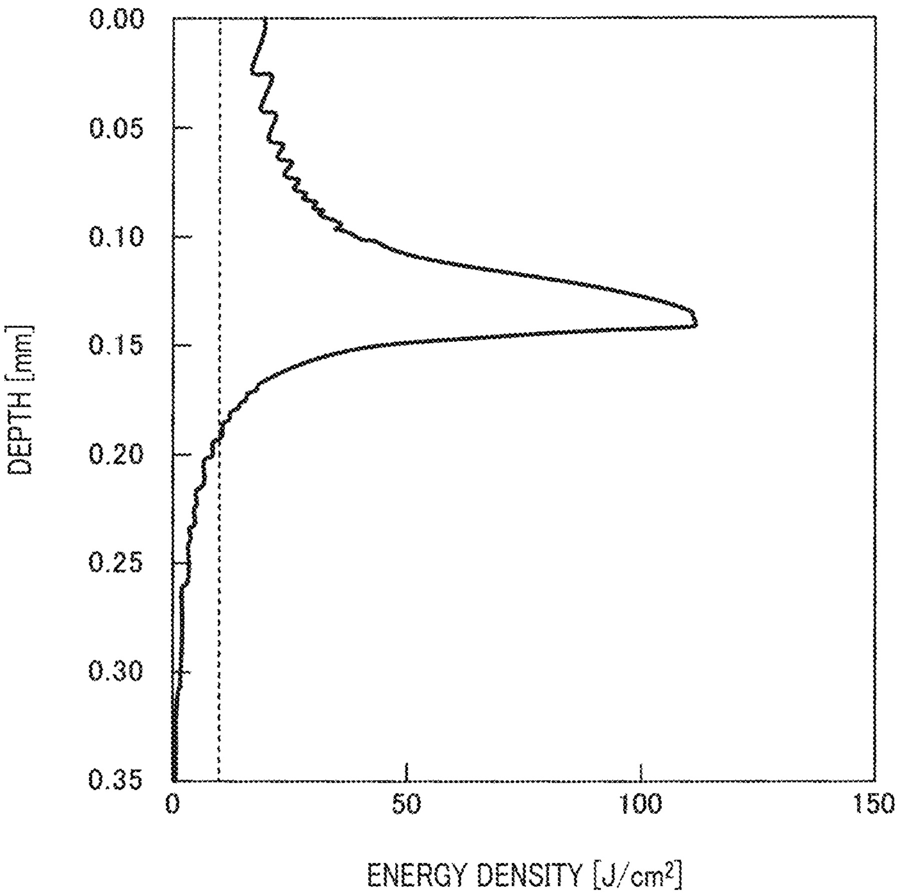
FIG. 25 is a diagram showing a relationship between the depth from a surface of the ingot and the energy density of the laser beam when a sample E is produced according to an experiment example.

At this moment, a state of the energy density of the laser beam radiated to the ingot (i.e. relationship between the depth from the upper surface of the ingot and the energy density) is shown in FIG. 25. The actual measurement data under the conditions 1 to 3 are shown in table 5.

TABLE 5

| Sample: E | | | | |
|---|---|---|---|---|
| | | target value | experimental value | Result |
| condition 1 | peak value Ep | ≤44 J/cm$^2$ | 19.9 J/cm$^2$ | OK |
| condition 2 | energy density rising rate α | ≥1000 J/cm$^3$ | 710 J/cm$^2$ | NG |
| condition 3 | depth range W | ≤30 μm | 22 μm | NG |

As shown in table 5, the sample E does not satisfy the conditions 1, 2 and 3. That is, the peak value Ep is too large, the energy density rising rate α is too small and the depth range W is too large.

Figure 26:
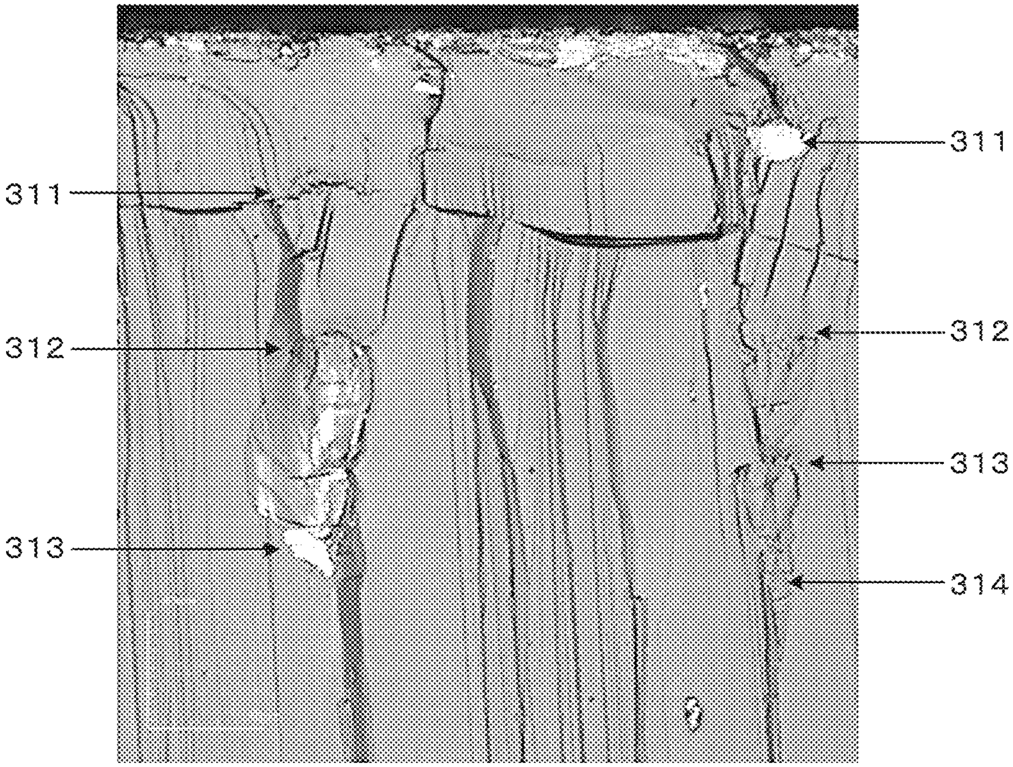
FIG. 26 is photos showing cross-sectional view of the sample E at 2 locations according to an experiment example.

Then, for the produced sample E, the ingot was cutoff and the inside thereof was observed. FIG. 26 shows photos taken by a metallurgical microscope (magnification is about 100). As shown in photos of FIG. 26, a significant multi-staged reformed section was observed in the sample E. In other words, it was observed that the reformed sections 311, 312, 313 and 314 were formed at three locations or more in the depth direction, and the area of the reformed section is small.

The following table 6 shows conditions in which the radiated laser beam satisfies when producing the samples A, B, C, D and E and an observation result of the cross-section.

TABLE 6

| sample | condition 1 | condition 2 | condition 3 | multi-staged portion | area of reformed section |
|---|---|---|---|---|---|
| A | OK | OK | OK | NO | 20 μm |
| B | NG | OK | OK | SMALL | 30-65 μm |
| C | OK | NG | NG | MEDIUM | 50-100 μm |
| D | OK | NG | OK | SMALL | 30-65 μm |
| E | NG | NG | NG | LARGE | 80-250 μm |

In table 6, OK indicates that condition is satisfied and NG indicates that condition is not satisfied. As shown in table 6, with the sample E where none of conditions 1 to 3 were satisfied, large multi-staged portion appeared in the reformed section. In contrast, for the samples that satisfy at least one of conditions 1 to 3, multi-staged portions of the reformed section were suppressed. In these sample, for samples that satisfy any 2 conditions in the condition 1 to 3, multi-staged portions of the reformed section were further suppressed. Moreover, for samples that satisfy all of the conditions 1 to 3, no multi-staged reformed sections were produced. From these results, it is realized that multi-staged portions of the reformed section can be effectively suppressed with a sample that satisfies at least one of conditions 1 to 3. Furthermore, satisfying all of conditions 1 to 3 effectively prevents the reformed section from being multi-staged. According to the experiment result for the above-described samples A, C and D, at least under the radiation conditions of the present experiment example, satisfying the condition of the peak value Ep of the enemy density less than or equal to 30 J/cm$^3$ is considered to be effective.

Second Embodiment

Figure 27:
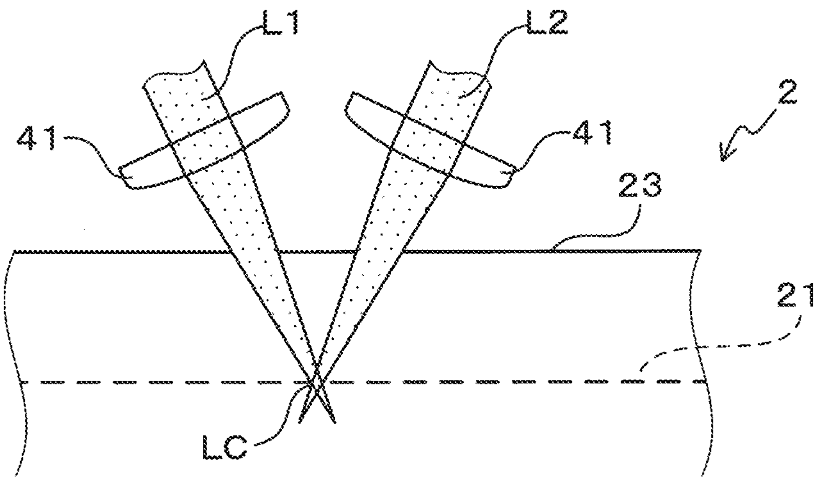
FIG. 27 is an explanatory diagram illustrating a state where the laser beam is radiated to a planned cutoff surface when viewed from a direction parallel to the planned cutoff surface according to a second embodiment.

According to the second embodiment, as shown in FIG. 27, a plurality of laser beams L1 and L2 having mutually non-parallel optical axes are utilized. The plurality of laser beams L1 and L2 are simultaneously radiated to the ingot 2 to be overlapped on the planned cutoff surface 21.

According to the present embodiment, the plurality of laser beams L1 and L2 having mutually non-parallel optical axes are each condensed at the condenser lens 41 and overlapped on the planned cutoff surface 21. The respective laser beams L1 and L2 are inclined relative to the normal direction of the planned cutoff surface 21. An overlapped portion Lc of the plurality of laser beams L1 and L2 has a large energy density. Thus, the reformed section 31 is formed in the planned cutoff surface 21.

The respective laser beams L1 and L2 condensed at the condenser lens 41 may be a Gaussian beam or an annular beam. Further, the plurality of laser beams L1 and L2 may be configured such that laser beams oscillated at the same laser oscillator are branched passing through different light passages.

Other configurations are the same as those in the first embodiment. In the reference symbols used in the second embodiment and latter embodiments, configurations having the same reference symbols as those in the existing embodiments represent the same constituents as those in the existing embodiments unless otherwise specified.

According to the present embodiment, the optical axes of the laser beams L1 and L2 are arranged on a plane orthogonal to the scanning direction of the laser beam towards the ingot 2, whereby the laser beams L1 and L2 can readily be incident entirely on the upper surface 23 of the ingot 2 even at the edge section of the planned cutoff surface 21. As a result, a decrease in the energy density of the laser beam on the planned cutoff surface 21 can be suppressed. Other than this, according to the second embodiment, the same effects and advantages can be obtained as those in the first embodiment. In the present embodiment, three or more laser beams having mutually non-parallel optical axes can be utilized.

Third Embodiment

Figure 28:
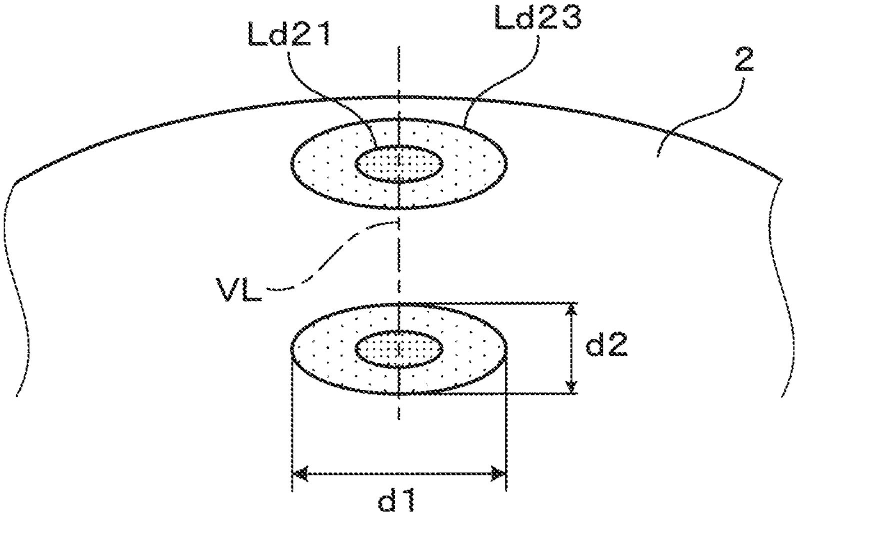
FIG. 28 is an explanatory diagram illustrating a shape of a laser beam on a planned cutoff surface and an upper surface of an ingot according to a third embodiment.

According to the third embodiment, as shown in Fig.28, the intensity distribution of the respective laser beams are set to be expanded in a direction orthogonal to the virtual line VL rather than a direction along the virtual line VL. As described in the first embodiment, the ingot 2 has a substantially cylindrical shape (see Fig.1). Then, numerous reformed sections 31 are formed in the planned cutoff surface 21, the reformed sections 31 being formed along each of a plurality of mutually parallel virtual lines VL orthogonal to the axial direction of the ingot 2 (see FIGS. 3A.38).

According to the present embodiment, as shown in FIG. 28, the intensity distribution of the laser beam for forming the respective reformed sections 31 when viewed from the axial direction is more expanded in a direction orthogonal to the virtual line VL than a direction along the virtual line VL. An elliptical outline Ld21 shown in FIG. 28 indicates an outline of the laser beam on the planned cutoff surface 21 and an elliptical outline Ld23 shown in FIG. 28 indicates an outline of the intensity distribution of the laser beam on the upper surface 23 of the ingot 2. Note that, the outline of the intensity distribution is a closed curve that surrounds portions having a predetermined intensity or larger. As shown in FIG. 28, when assuming a length of the direction orthogonal to the virtual line VL is d1 and a length of the direction along the virtual line VL is d2 in the outline Ld 23, the lengths have a relationship d1>d2. Other configurations are the same as those in the first embodiment.

According to the present embodiment, the energy density of the laser beam radiated to a portion in the vicinity of the edge section of the planned cutoff surface 21 of the ingot 2 can readily be prevented from being too small compared to the energy density of the laser beam in other portions.

Figure 29:
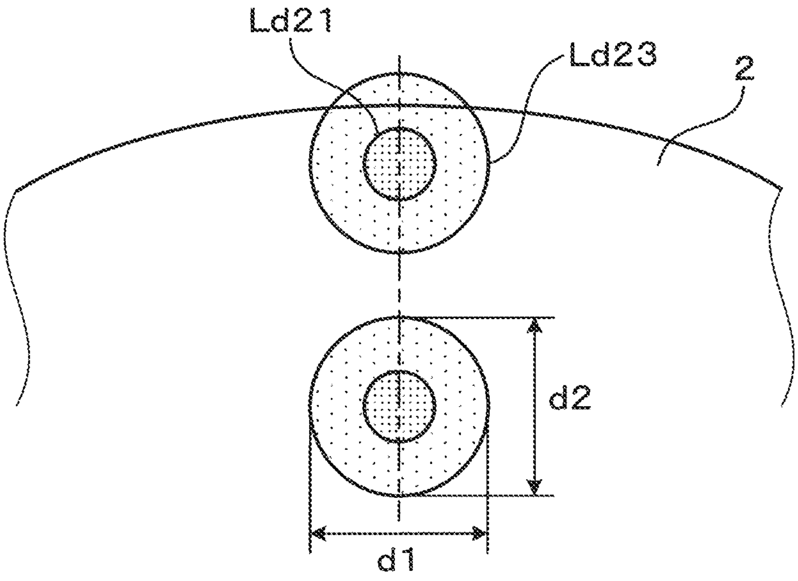
FIG. 29 is an explanatory diagram illustrating a shape of an annular laser beam on a planned cutoff surface and an upper surface of the ingot.

Here, as a comparative example of the present embodiment, a case will be considered as shown in FIG. 29, that is, the intensity distribution of the laser beam is either a circuit circular distribution where d1=d2 or an elliptical distribution where d1<d2. In this case, a part of the laser beam radiated to a portion in the vicinity of the edge section of the ingot 2 is likely to be incident on a side surface of the ingot 2. This is because, if the length d2 is large, as shown in FIG. 29, a part of the outline Ld23 of the laser beam on the plane including the upper surface of the ingot 2 protrudes outside the outline of the edge section of the ingot 2. The protruded laser beam is incident on the side surface of the ingot 2. As a result, the energy density of the laser beam on the planned cutoff surface 21 may decrease. In other words, the energy density of the laser beam radiated to a portion in the vicinity of the edge section may become smaller than the energy density of the laser beam radiated to a portion inside the edge section. This may cause an insufficient state of the reformation in the vicinity of the edge section.

In this regard, according to the present embodiment, the intensity distribution of the laser beam is set to be an elliptical shape where length relationship is d1>d2, whereby the laser beam radiated to a portion in the vicinity of the planned cutoff surface 21 may also be prevented from being incident on the side surface of the ingot 2. Specifically, compared to a case of an annular laser beam, even when the optical axis is set to be closer to the edge section, the energy density is unlikely to decrease on the planned cutoff surface 21. As a result, the above-described issues can be avoided. Other than this, according to the third embodiment, the same effects and advantages can be obtained as those in the first embodiment.

Fourth Embodiment

Figure 30:
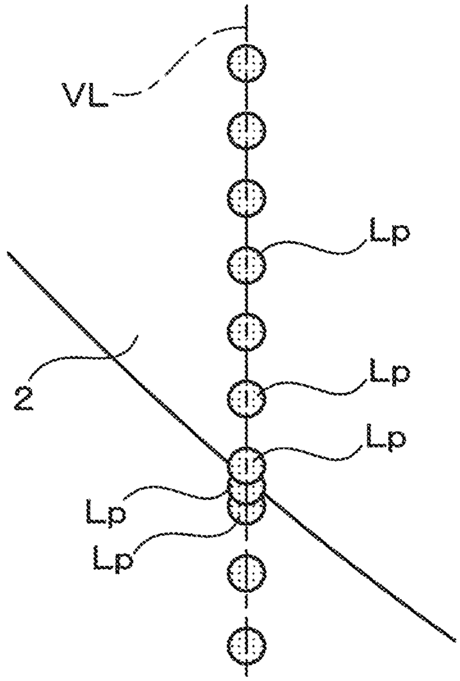
FIG. 30 is an explanatory diagram illustrating a radiated position where the laser beam is radiated to a portion in the vicinity of an edge section of the ingot according to a fourth embodiment.

According to the fourth embodiment, as shown in FIG. 30, in the edge section of the ingot 2, a pitch between radiation points Lp of the laser beam adjacently positioned along the virtual line VL is set to be shorter than other portions.

As disclosed in the third embodiment, a part of the laser beam radiated to the edge section of the ingot 2 is likely to be incident on the side surface of the ingot 2. Hence, the energy density on the planned cutoff surface 21 is likely to decrease compared to that of other portions. In this respect, according to the present embodiment, at the edge section of the ingot 2, the pitch between radiation points Lp of the laser beam is set to be shorter than that of other portions. Thus, an appropriate reformed section 31 having sufficient reformation state can be formed even at the edge section of the planned cutoff surface 21. Other than this, according to the fourth embodiment, the configuration is the same as that of the first embodiment and the same effects and advantages can be obtained as those in the first embodiment.

Fifth Embodiment

Figure 31:
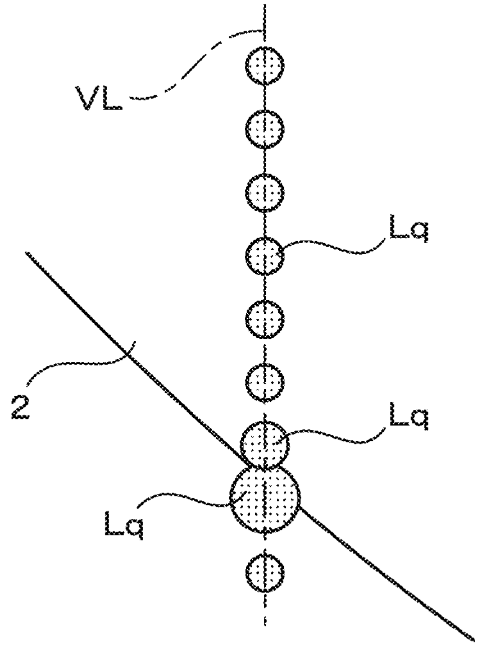
FIG. 31 is an explanatory diagram illustrating a radiated position where the laser beam is radiated to a portion in the vicinity of an edge section of the ingot according to a fifth embodiment.

According to the fifth embodiment, as shown in FIG. 31, the energy of the laser beam radiated to the edge section of the ingot 2 is set to be larger than that of the other portions. Note that the size of a dot Lq shown in FIG. 31 indicates an amount of the energy in each laser beam. According to the present embodiment, as described above, a laser beam having larger energy is radiated to the edge section of the ingot 2 where the energy density is likely to decrease on the planned cutoff surface 21. Thus, an appropriate reformed section 31 having sufficient reformation state can be formed even at the edge section of the planned cutoff surface 21. Other than this, according, to the fifth embodiment, the configuration is the same as that of the first embodiment and the same effects and advantages can be obtained as those in the first embodiment.

Sixth Embodiment

Figure 32:
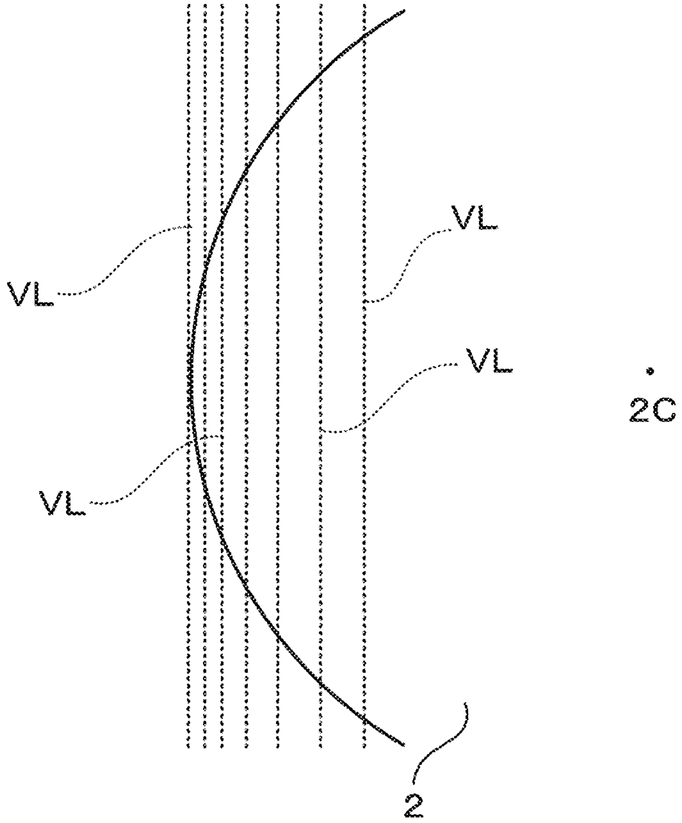
FIG. 32 is an explanatory diagram illustrating a radiated position where the laser beam is radiated to a portion in the vicinity of an edge section of the ingot according to a sixth embodiment.

According to the sixth embodiment, as shown in FIG. 32, intervals between virtual lines VL positioned apart from the center axis 2C of the ingot 2 is set to be narrower than those of the virtual lines VL positioned close to the center axis 2C.

According to the present embodiment, as described above, the virtual lines VL are arranged concentratedly at the edge section of the ingot 2 where the energy density is likely to decrease. Then, the laser beam is radiated along these virtual lines VL. Thus, an appropriate reformed section 31 having sufficient reformation state can be formed even at the edge section of the planned cutoff surface 21. Other than this, according to the sixth embodiment, the configuration is the same as that of the first embodiment and the same effects and advantages can be obtained as those in the first embodiment.

The present disclosure is not limited to the above-described respective embodiments, but may be modified in various manners without departing from the spirit of the present disclosure.

Conclusion

The present disclosure is achieved in light of the above-described circumstances and provides a method for manufacturing wafers.

A first aspect of the present disclosure is a manufacturing method for wafers wherein a transparent or semi-transparent ingot (2) is cutoff with a laser beam (L) to obtain the wafers, the method comprising steps of: radiating the laser beam to the ingot at a plurality of portions from a direction crossing a planned cutoff surface (21) where the ingot is to be cutoff; and forming, with the radiation of the laser beam, a plurality of reformed sections (31) at a portion corresponding to a depth position of the planned cutoff surface in the ingot to extend a crack (32) from the reformed section as an origin, thereby slicing wafers, wherein an energy density, as an energy per unit area of the laser beam in the ingot when radiating the laser beam to the ingot, exceeds a reforming threshold (Eth) capable of reforming a part of the ingot on the planned cutoff surface;

the energy density satisfies at least one or more of following a condition 1, a condition 2 and a condition 3:

condition 1: a peak value (Ep) of the energy density is lower than or equal to 44 J/cm$^2$ condition 2: a rising rate (α) of the energy density at a portion corresponding to the most shallow position where the energy density reaches the reforming threshold Eth is larger than or equal to 1000 J/cm$^3$ condition 3: a range of depth (W) where the energy density exceeds the reforming threshold is smaller than or equal to 30 μm.

The effects and advantages of the present are as follows. In the manufacturing method of wafers, the energy density of the laser beam is controlled in the above-described manner. Thus, the reformed sections can be formed at the desired depth position while suppressing the multi-stage reformed section. Accordingly, material loss of the ingot is suppressed and the manufacturing yield can be improved.

As described above, according to the above aspect, the manufacturing yield can be improved. Note that reference symbols in parentheses described in claims and summary section indicate relationship with the specific means described in the later-described embodiments and does not limit the technical scope of the present disclosure.

What is claimed is:

1. A manufacturing method for wafers wherein a transparent or semi-transparent ingot is cutoff with a laser beam to obtain the wafers, the method comprising steps of:

radiating the laser beam to the ingot at a plurality of portions from a direction crossing a planned cutoff surface where the ingot is to be cutoff; and forming, with a radiation of the laser beam, a plurality of reformed sections at a portion corresponding to a depth position of the planned cutoff surface in the ingot to extend a crack from a reformed section of the reformed section as an origin, thereby slicing the wafers, wherein an energy density, as an energy per unit area of the laser beam in the ingot when radiating the laser beam to the ingot, exceeds a reforming threshold capable of reforming a part of the ingot on the planned cutoff surface;

the energy density satisfies all of the following conditions, condition 1, condition 2 and condition 3:

condition 1: a peak value of the energy density is lower than or equal to 44 J/cm$^2$;

condition 2: a rising rate of the energy density at a portion corresponding to a most shallow position where the energy density reaches the reforming threshold is larger than or equal to 1000 J/cm$^3$;

condition 3: a range of depth where the energy density exceeds the reforming threshold is smaller than or equal to 30 pm.

2. The manufacturing method according to claim 1, wherein the laser beam radiated to the ingot is a pulse laser light of which the pulse width is 250 fs to 10 ns.

3. The manufacturing method according to claim 1, wherein the laser beam is simultaneously radiated from a plurality of directions to the ingot;

the laser beam from the plurality of directions are mutually overlapped in a part of a depth region including a depth position of the planned cutoff surface of the ingot, thereby forming an overlapped portion; and the overlapped portion has a length in a depth direction of 5 to 50 μm.

4. The manufacturing method according to claim 1, wherein a plurality of laser beams having mutually non-parallel optical axes are simultaneously radiated to the ingot such that the plurality of laser beams are overlapped on the planned cutoff surface.

5. The manufacturing method according to claim 1, wherein the ingot has a cylindrical shape; reformed sections are formed in the planned cutoff surface, the reformed sections being formed along each of a plurality of mutually parallel lines orthogonal to an axial direction of the ingot; and an intensity distribution of the laser beam for forming respective reformed sections, when viewed from the axial direction, is expanded in a direction orthogonal to the lines rather than a direction along the lines.

6. The manufacturing method according to claim 1, wherein the ingot has a cylindrical shape;

reformed sections are formed in the planned cutoff surface, the reformed sections being formed along each of a plurality of mutually parallel lines orthogonal to an axial direction of the ingot; and in an edge section of the ingot, a pitch between radiation points of the laser beam adjacently positioned along the lines is set to be shorter than in other portions of the ingot.

7. The manufacturing method according to claim 1, wherein the ingot has a cylindrical shape;

reformed sections are formed in the planned cutoff surface, the reformed sections being formed along each of a plurality of mutually parallel lines orthogonal to an axial direction of the ingot; and an energy of the laser beam radiated to an edge section of the ingot is set to be larger than an energy of the laser beam radiated to other portions of the ingot.

8. The manufacturing method according to claim 1, wherein the ingot has a cylindrical shape;

reformed sections are formed in the planned cutoff surface, the reformed sections being formed along each of a plurality of mutually parallel lines orthogonal to an axial direction of the ingot; and intervals between virtual lines positioned apart from a center axis of the ingot are set to be narrower than those of the lines positioned close to the center axis.

9. The manufacturing method according to claim 1, wherein reformed sections are formed being along each of a plurality of mutually parallel lines in the planned cutoff surface; and the lines are lines parallel to a direction where an off angle is formed on the ingot when viewed from an axial direction of the ingot.

* * * * *